United States Patent
Tsuda et al.

(10) Patent No.: US 11,936,076 B2
(45) Date of Patent: Mar. 19, 2024

(54) METAL SUPPORT FOR ELECTROCHEMICAL ELEMENT, ELECTROCHEMICAL ELEMENT, ELECTROCHEMICAL MODULE, ELECTROCHEMICAL DEVICE, ENERGY SYSTEM, SOLID OXIDE FUEL CELL, AND METHOD FOR MANUFACTURING METAL SUPPORT

(71) Applicant: Osaka Gas Co., Ltd., Osaka (JP)

(72) Inventors: Yuji Tsuda, Osaka (JP); Mitsuaki Echigo, Osaka (JP); Tadayuki Sogi, Osaka (JP); Kazuyuki Minami, Osaka (JP); Kyohei Manabe, Osaka (JP)

(73) Assignee: Osaka Gas Co., Ltd., Osaka (JP)

( * ) Notice: Subject to any disclaimer, the term of this patent is extended or adjusted under 35 U.S.C. 154(b) by 727 days.

(21) Appl. No.: 17/044,051

(22) PCT Filed: Mar. 29, 2019

(86) PCT No.: PCT/JP2019/014376
§ 371 (c)(1),
(2) Date: Feb. 8, 2021

(87) PCT Pub. No.: WO2019/189911
PCT Pub. Date: Oct. 3, 2019

(65) Prior Publication Data
US 2023/0163325 A1    May 25, 2023

(30) Foreign Application Priority Data
Mar. 30, 2018  (JP) .................. 2018-070340

(51) Int. Cl.
*H01M 8/0271* (2016.01)
*H01M 8/1097* (2016.01)
(Continued)

(52) U.S. Cl.
CPC ....... *H01M 8/0271* (2013.01); *H01M 8/1097* (2013.01); *H01M 8/1226* (2013.01); *H01M 8/1286* (2013.01)

(58) Field of Classification Search
CPC ............. H01M 8/0271; H01M 8/1097; H01M 8/1226; H01M 8/1286; H01M 8/021;
(Continued)

(56) References Cited

U.S. PATENT DOCUMENTS

2005/0026030 A1* 2/2005 Mardilovich ....... H01M 8/1226
429/432
2008/0107948 A1  5/2008 Yamanis
(Continued)

FOREIGN PATENT DOCUMENTS

JP  2005150053 A  6/2005
JP  2008525967 A  7/2008
(Continued)

OTHER PUBLICATIONS

WO-2015037727-A1 translation (Year: 2015).*

*Primary Examiner* — Pamela H Weiss
*Assistant Examiner* — Amanda Rosenbaum
(74) *Attorney, Agent, or Firm* — The Webb Law Firm

(57) ABSTRACT

A metal support for an electrochemical element where the metal support includes a plate face, has a plate shape as a whole, and has a warping degree of $1.5 \times 10^{-2}$ or less determined by calculating a least square value through the least squares method using at least three points in the plate face of the metal support, calculating a first difference between the least square value and a positive-side maximum displacement value on a positive side with respect to the least square value and a second difference between the least square value and a negative-side maximum displacement value on a negative side that is opposite to the positive side (Continued)

with respect to the least square value, and dividing the sum of the first difference and the second difference by a maximum length of the plate face of the metal support that passes through a center of gravity.

20 Claims, 5 Drawing Sheets

(51) Int. Cl.
*H01M 8/1226* (2016.01)
*H01M 8/1286* (2016.01)

(58) Field of Classification Search
CPC ....... H01M 2008/1293; H01M 8/0232; H01M 8/2425; H01M 8/04007; H01M 8/0494
See application file for complete search history.

(56) References Cited

U.S. PATENT DOCUMENTS

| | | | |
|---|---|---|---|
| 2010/0055531 A1* | 3/2010 | Ohmori | ............... H01M 8/2483 29/623.2 |
| 2013/0328184 A1* | 12/2013 | Iwayama | ............ H01L 23/3731 428/471 |

FOREIGN PATENT DOCUMENTS

| | | | | |
|---|---|---|---|---|
| JP | 201080428 A | | 4/2010 | |
| JP | 2010129459 A | | 6/2010 | |
| JP | 201341717 A | | 2/2013 | |
| JP | 201377448 A | | 4/2013 | |
| JP | 2013201038 A | | 10/2013 | |
| JP | 201666616 A | | 4/2016 | |
| JP | 2016066616 A | * | 4/2016 | |
| WO | WO-2015037727 A1 | * | 3/2015 | .......... H01M 8/0236 |

* cited by examiner

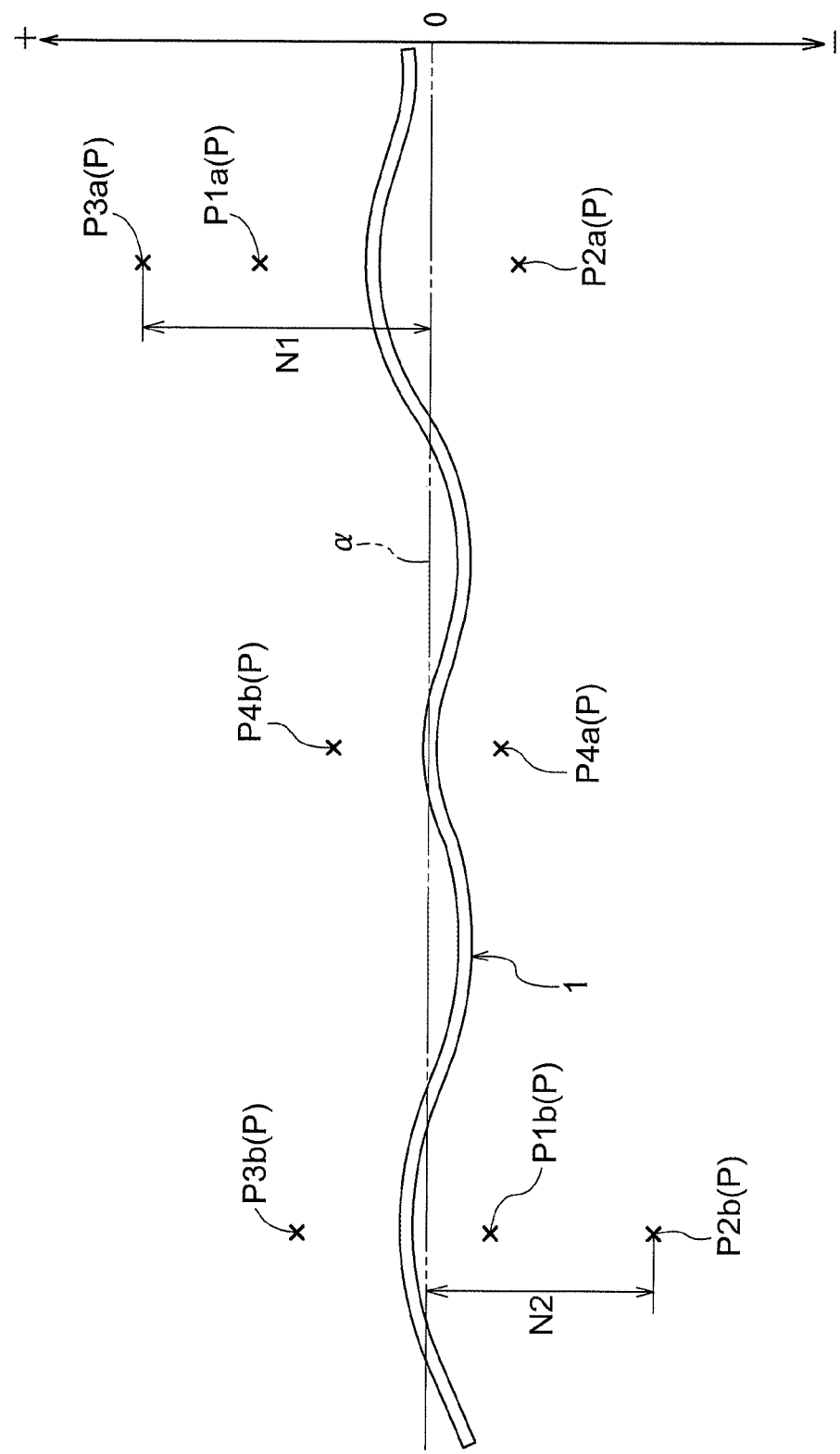

METAL SUPPORT FOR
ELECTROCHEMICAL ELEMENT,
ELECTROCHEMICAL ELEMENT,
ELECTROCHEMICAL MODULE,
ELECTROCHEMICAL DEVICE, ENERGY
SYSTEM, SOLID OXIDE FUEL CELL, AND
METHOD FOR MANUFACTURING METAL
SUPPORT

CROSS-REFERENCE TO RELATED
APPLICATIONS

This application is the United States national phase of International Application No. PCT/JP2019/014376 filed Mar. 29, 2019, and claims priority to Japanese Patent Application No. 2018-070340 filed Mar. 30, 2018, the disclosures of which are hereby incorporated by reference in their entirety.

BACKGROUND OF THE INVENTION

Field of the Invention

The present invention relates to a metal support for an electrochemical element, and the like.

Description of Related Art

Japanese Patent Application No. JP 2008-525967A (Patent Document 1) discloses the structure of a metal support for a metal-supported SOFC. The metal support disclosed in Patent Document 1 has a structure in which a metal foil having a thickness of about 15 μm is stacked on a metal mesh having a thickness of 200 μm or more obtained by weaving metal wire.

SUMMARY OF THE INVENTION

However, in the case of the structure of the metal support as disclosed in Patent Document 1, when an electrode layer is formed on the metal foil through, for example, screen printing, the metal foil becomes distorted along the unevenness of the metal mesh due to printing pressure of a squeegee because the metal foil has low strength. There is a problem in that it is difficult to form an electrode layer having a uniform thickness and few surface defects such as breakage and separation due to the distortion of the metal foil or the printing pressure of a squeegee being less likely to be uniformly applied.

The present invention was achieved in light of the aforementioned problem, and an object thereof is to provide a metal support for an electrochemical element and the like. This metal support for an electrochemical element is a metal support with reduced warping, and thus an electrode layer having a uniform thickness and reduced surface defects such as breakage and separation can be formed thereon.

Means for Solving Problem

Configuration 1

In a characteristic configuration of a metal support for an electrochemical element according to the present invention,
the metal support includes a plate face and having a plate shape as a whole,
the metal support is provided with a plurality of penetration spaces that pass through the metal support from a front face to a back face, the front face being a face to be provided with an electrode layer,
a region of the front face provided with the penetration spaces is a hole region, and
the metal support satisfies a condition that a warping degree is $1.5 \times 10^{-2}$ or less,
wherein the warping degree is determined by calculating a least square value through a least squares method using at least three points in the plate face of the metal support, calculating a first difference between the least square value and a positive-side maximum displacement value on a positive side with respect to the least square value and a second difference between the least square value and a negative-side maximum displacement value on a negative side that is opposite to the positive side with respect to the least square value, and dividing Da that is a sum of the first difference and the second difference by a maximum length Lmax of the plate face of the metal support that passes through a center of gravity to determine Da/Lmax, which is used as the warping degree.

With the above-mentioned characteristic configuration, regarding a plurality of points in the plate face of the metal support, the sum of the difference between the positive-side maximum displacement value and the least square value and the difference between the negative-side maximum displacement value and the least square value is calculated. When there are a plurality of points, the least square value is, for example, a straight line, a plane, or the like that is calculated from the plurality of points using the least squares method. For example, by adding the maximum displacement value on the positive side (positive-side maximum displacement value) with respect to the least square value, which is a straight line, a plane, or the like, to the maximum displacement value on the negative side (negative-side maximum displacement value) with respect to the least square value to determine Da, the warping degree of a metal support plate is determined.

With the above-mentioned characteristic configuration, by further dividing Da by the maximum length Lmax of the metal support, even the warping degrees of metal supports that are different in size can be compared based on a certain reference value.

By accurately calculating the warping degree of the metal support as described above and setting the warping degree to $1.5 \times 10^{-2}$ or less, an electrode layer having a uniform thickness and reduced surface defects such as breakage and separation can be formed on the metal support. If such an electrode layer having reduced surface defects can be formed, an electrolyte layer, a counter electrode layer, and the like that each have a uniform thickness and reduced surface defects such as breakage and separation can also be formed on the electrode layer. Accordingly, the layers can be formed with increased adhesion therebetween, and thus a high-performance electrochemical element is obtained.

Configuration 2

In another characteristic configuration of the metal support for an electrochemical element according to the present invention,
at least two points in the plate face of the metal support are located on at least one straight line passing through the center of gravity and are opposed to each other in the plate face of the metal support with the center of gravity being located at a center therebetween.

With the above-mentioned characteristic configuration, at least two points in the plate face of the metal support are located on at least one straight line passing through the center of gravity and opposed to each other in the plate face of the metal support with the center of gravity being located at the center therebetween. Accordingly, the least square value is calculated using points that are located in a direction away from each other relative to the center of gravity in the plate face. That is, the least square value is calculated using points scattered in the plate face rather than points in a localized region on the metal support. Accordingly, the least square value is calculated as a value relating to the shape of the plate face of the metal support. Using this least square value as a reference makes it possible to accurately calculate Da used as a reference for determining the warping degree of the metal support.

Configuration 3

In another characteristic configuration of the metal support for an electrochemical element according to the present invention, when a plurality of straight lines are used as the straight line, the plurality of straight lines divide 360° by a predetermined angle around the center of gravity.

With the above-mentioned characteristic configuration, a plurality of straight lines passing through the center of gravity of the metal support radially extend while being away from each other by a predetermined angle around the center of gravity. Accordingly, the least square value is calculated based on points scattered over substantially the entire metal support. Using this least square value as a reference makes it possible to accurately calculate Da used as a reference for determining the warping degree of the metal support. It is preferable that the plurality of straight lines passing through the center of gravity of the metal support radially extend while being away from each other by an angle of 90° or less around the center of gravity because Da can be calculated more accurately, and it is more preferable that the straight lines radially extend while being away from each other by an angle of 60° or less. Also, it is preferable that the plurality of straight lines passing through the center of gravity of the metal support radially extend while being away from each other by an angle of 30° or more around the center of gravity because the warping degree can be easily measured.

Configuration 4

In another characteristic configuration of the metal support for an electrochemical element according to the present invention, at least two points that are opposed to each other in the plate face of the metal support with the center of gravity being located at a center therebetween are located between a peripheral edge of the metal support and the hole region.

With the above-mentioned characteristic configuration, the least square value is calculated using at least two points located in a region between the peripheral edge of the metal support and the hole region, that is, in the peripheral edge portion of the metal support. In general, the warping degree of the peripheral edge portion is larger than that of the central portion in a metal support. When the area of a metal support is relatively small, a difference in the warping degree between the central portion and the peripheral edge portion in the metal support is not large, but when the area is increased, the peripheral edge portion is warped more greatly than the central portion. Accordingly, calculating Da based on points located in the peripheral edge portion makes it possible to accurately calculate Da and thus accurately calculate the warping degree of the metal support.

Configuration 5

In another characteristic configuration of the metal support for an electrochemical element according to the present invention, at least two points that are opposed to each other in the plate face of the metal support with the center of gravity being located at a center therebetween are located between a peripheral edge of the metal support and the electrode layer to be formed on the metal support.

With the above-mentioned characteristic configuration, calculating Da based on points located much closer to the peripheral edge portion makes it possible to accurately calculate Da, and thus the warping degree of the metal support can be accurately calculated.

Configuration 6

In another characteristic configuration of the metal support for an electrochemical element according to the present invention, the least square value is a least square plane calculated through a least squares method using at least four points in the plate face of the metal support.

With the above-mentioned characteristic configuration, a least square plane is calculated using at least four points in the plate face. Calculating Da based on differences from the least square plane also makes it possible to accurately determine the warping degree.

It is preferable that points located in a direction away from each other with respect to the center of gravity in the plate face are used as the above-mentioned at least four points in the plate face because a least square plane that approximates the shape of the plate face is calculated based on points scattered in the plate face. Also, it is preferable that a least square plane is calculated through the least squares method using five or more points in the plate face because more points in the plate face are used and thus Da can be accurately calculated. Also, it is preferable that a least square plane is calculated through the least squares method using twelve or less points in the plate face because the warping degree can be easily measured.

Configuration 7

In another characteristic configuration of the metal support for an electrochemical element according to the present invention, each of front-side openings that are openings of the penetration spaces formed in the front face has a circular shape or a substantially circular shape having a diameter of 10 μm or more and 60 μm or less.

The above-mentioned characteristic configuration is favorable because the processing for forming the penetration spaces is facilitated, and the workability and cost of mass production can be improved. The front-side openings preferably have a circular shape or a substantially circular shape having a diameter of 10 μm or more, more preferably have a circular shape or a substantially circular shape having a diameter of 15 μm or more, and even more preferably have a circular shape or a substantially circular shape having a diameter of 20 μm or more. The reason for this is that employing such a configuration makes it possible to supply a sufficient amount of fuel gas (or air) to an electrode layer of the electrochemical element, and thus the performance of the electrochemical element can be further improved. Also, the front-side openings preferably have a circular shape or a substantially circular shape having a diameter of 60 μm or less, more preferably have a circular shape or a substantially circular shape having a diameter of 50 μm or less, and even more preferably have a circular shape or a substantially circular shape having a diameter of 40 μm or less. The reason for this is that employing such a configuration makes it easier to form the constitutional elements of the electrochemical element such as an electrode layer on the metal support provided with a plurality of penetration spaces while improving the strength of the metal support.

Configuration 8

In another characteristic configuration of the metal support for an electrochemical element according to the present invention, each of back-side openings that are openings of the penetration spaces formed in the back face has an area or a diameter larger than those of front-side openings that are openings of the penetration spaces formed in the front face.

The above-mentioned characteristic configuration is favorable because the processing for forming the penetration spaces is further facilitated, and the workability and cost of mass production can be improved. Moreover, this characteristic configuration is favorable because the ratio of the thickness of the entire metal support to the area of the front-side openings of the metal support can be increased, thus making it easy to form the constitutional elements of the electrochemical element such as an electrode layer on the metal support while ensuring sufficient strength.

Configuration 9

In another characteristic configuration of the metal support for an electrochemical element according to the present invention, intervals between front-side openings that are openings of the penetration spaces formed in the front face are 0.05 mm or more and 0.3 mm or less.

The above-mentioned characteristic configuration is favorable because both the strength and the performance of the metal support can be increased. The intervals between the front-side openings are preferably 0.05 mm or more, more preferably 0.1 mm or more, and even more preferably 0.15 mm or more. The reason for this is that employing such a configuration makes it possible to further increase the strength of the metal support as well as makes it easier to form the constitutional elements of the electrochemical element such as an electrode layer on the metal support provided with a plurality of penetration spaces. Also, the intervals between the front-side openings are preferably 0.3 mm or less, more preferably 0.25 mm or less, and even more preferably 0.2 mm or less. The reason for this is that employing such a configuration makes it possible to supply a sufficient amount of fuel gas (or air) to the electrode layer of the electrochemical element, and thus the performance of the electrochemical element can be further improved.

Configuration 10

In another characteristic configuration of the metal support for an electrochemical element according to the present invention, the metal support has a thickness of 0.1 mm or more and 1.0 mm or less.

The above-mentioned characteristic configuration is favorable because the strength of the entire metal support can be sufficiently maintained while penetration spaces are formed to have an appropriate size, thus making it possible to improve workability in mass production and reduce the material cost. The thickness of the metal support is preferably 0.1 mm or more, more preferably 0.15 mm or more, and even more preferably 0.2 mm or more. The reason for this is that employing such a configuration makes it possible to further facilitate handling in mass production while maintaining the strength of the metal support. The thickness of the metal support is preferably 1.0 mm or less, more preferably 0.75 mm or less, and even more preferably 0.5 mm or less. The reason for this is that employing such a configuration makes it possible to further reduce the material cost of the metal support while maintaining the strength of the metal support.

Configuration 11

In another characteristic configuration of the metal support for an electrochemical element according to the present invention, the metal support is made of a Fe—Cr based alloy.

With the above-mentioned characteristic configuration, the oxidation resistance and high-temperature strength of the metal support can be improved. Moreover, this characteristic configuration is favorable because the thermal expansion coefficient of the metal support can be set to be close to those of the materials of the constitutional elements of the electrochemical element such as an electrode layer and an electrolyte layer, which are formed on/over the metal support, thus making it possible to realize an electrochemical element having excellent heat-cycle durability.

Configuration 12

In a characteristic configuration of an electrochemical element according to the present invention, at least an electrode layer, an electrolyte layer, and a counter electrode layer are provided on/over the front face of the above-described metal support.

The electrochemical element in which at least an electrode layer, an electrolyte layer, and a counter electrode layer are provided on/over the front face of the above-described metal support is favorable because sufficient performance is ensured, and the workability and cost of mass production are improved. Furthermore, this electrochemical element is favorable because the constitutional elements of the electrochemical element such as an electrode layer and an electrolyte layer are formed on/over the metal support having excellent strength, and therefore, the constitutional elements of the electrochemical element such as an electrode layer and an electrolyte layer can be formed as thin layers or thin films, thus making it possible to reduce the material cost of the electrochemical element.

Configuration 13

In a characteristic configuration of an electrochemical module according to the present invention, a plurality of the above-described electrochemical elements are arranged in an assembled state.

With the above-mentioned characteristic configuration, the plurality of the above-described electrochemical elements are arranged in an assembled state, thus making it possible to obtain an electrochemical module that is compact, has high performance, and has excellent strength and reliability, while also suppressing the material cost and processing cost.

Configuration 14

A characteristic configuration of an electrochemical device according to the present invention includes at least the above-described electrochemical module and a reformer, and includes a fuel supply unit that supplies fuel gas containing a reducing component to the electrochemical module.

The above-mentioned characteristic configuration includes the electrochemical module and the reformer and includes the fuel supply unit for supplying the fuel gas containing a reducing component to the electrochemical module, thus making it possible to use an existing raw fuel supply infrastructure such as city gas to realize an electrochemical device including the electrochemical module that has excellent durability, reliability, and performance. Also, it is easier to construct a system that recycles unused fuel gas discharged from the electrochemical module, thus making it possible to realize a highly efficient electrochemical device.

Configuration 15

A characteristic configuration of an electrochemical device according to the present invention includes at least the above-described electrochemical module and an inverter that extracts power from the electrochemical module.

The above-mentioned characteristic configuration is preferable because it makes it possible to boost, using an inverter, electrical output obtained from the electrochemical module that has excellent durability, reliability, and performance, or to convert a direct current into an alternating current, and thus makes it easy to use the electrical output obtained from the electrochemical module.

Configuration 16

A characteristic configuration of an energy system according to the present invention includes the above-described electrochemical device and waste heat utilization system that reuses heat discharged from the electrochemical device.

The above-mentioned characteristic configuration includes the electrochemical device and the waste heat utilization system that reuses heat discharged from the electrochemical device, thus making it possible to realize an energy system that has excellent durability, reliability, and performance as well as excellent energy efficiency. It should be noted that it is also possible to realize a hybrid system that has excellent energy efficiency by combination with a power generation system that generates power with use of combustion heat from unused fuel gas discharged from the electrochemical device.

Configuration 17

A characteristic configuration of a solid oxide fuel cell according to the present invention includes the above-described electrochemical element wherein a power generation reaction is caused in the electrochemical element.

With the above-mentioned characteristic configuration, the solid oxide fuel cell including the electrochemical element that has excellent durability, reliability, and performance can cause a power generation reaction, and thus a solid oxide fuel cell having high durability and high performance can be obtained. It should be noted that a solid oxide fuel cell that can be operated in a temperature range of 650° C. or higher during the rated operation is more preferable because a fuel cell system that uses hydrocarbon-based gas such as city gas as raw fuel can be constructed such that waste heat discharged from a fuel cell can be used in place of heat required to convert raw fuel to hydrogen, and the power generation efficiency of the fuel cell system can thus be improved. A solid oxide fuel cell that is operated in a temperature range of 900° C. or lower during the rated operation is more preferable because the effect of suppressing volatilization of Cr from a metal-supported electrochemical element can be improved, and a solid oxide fuel cell that is operated in a temperature range of 850° C. or lower during the rated operation is even more preferable because the effect of suppressing volatilization of Cr can be further improved.

Configuration 18

A characteristic configuration of a method for manufacturing a metal support according to the present invention is a method for manufacturing the above-mentioned metal support, including forming the plurality of penetration spaces passing through the metal support from the front face to the back face through laser processing, punching processing, etching processing, or a combination thereof.

With the above-mentioned characteristic configuration, the processing for forming the penetration spaces is facilitated, and the workability and cost of mass production can be improved.

Configuration 19

A characteristic configuration of the method for manufacturing a metal support according to the present invention includes a smoothing processing step.

The above-mentioned characteristic configuration is preferable because a metal support having a small warping degree is obtained through smoothing processing, thus making it easy to form an electrochemical element on the metal support. It is preferable to perform the smoothing processing such that the warping degree of a metal support is $1.5 \times 10^{-2}$ or less because it is easy to form an electrochemical element on the metal support.

BRIEF DESCRIPTION OF THE DRAWING

FIG. 7 is an explanatory diagram showing a method for calculating the warping degree of the metal support.

DESCRIPTION OF THE INVENTION

First Embodiment

Hereinafter, an electrochemical element E and a solid oxide fuel cell (SOFC) according to this embodiment will be described with reference to FIG. 1. The electrochemical element E is used as a constitutional element of a solid oxide fuel cell that receives a supply of air and fuel gas containing hydrogen and generates power, for example. It should be noted that when the positional relationship between layers and the like are described in the description below, a counter electrode layer 6 side may be referred to as "upper portion" or "upper side", and an electrode layer 2 side may be referred to as "lower portion" or "lower side", with respect to an electrolyte layer 4, for example. In addition, in a metal support 1, a face on which the electrode layer 2 is formed is referred to as "front face 1a", and a face on an opposite side is referred to as "back face 1b".

Electrochemical Element

Figure 1:
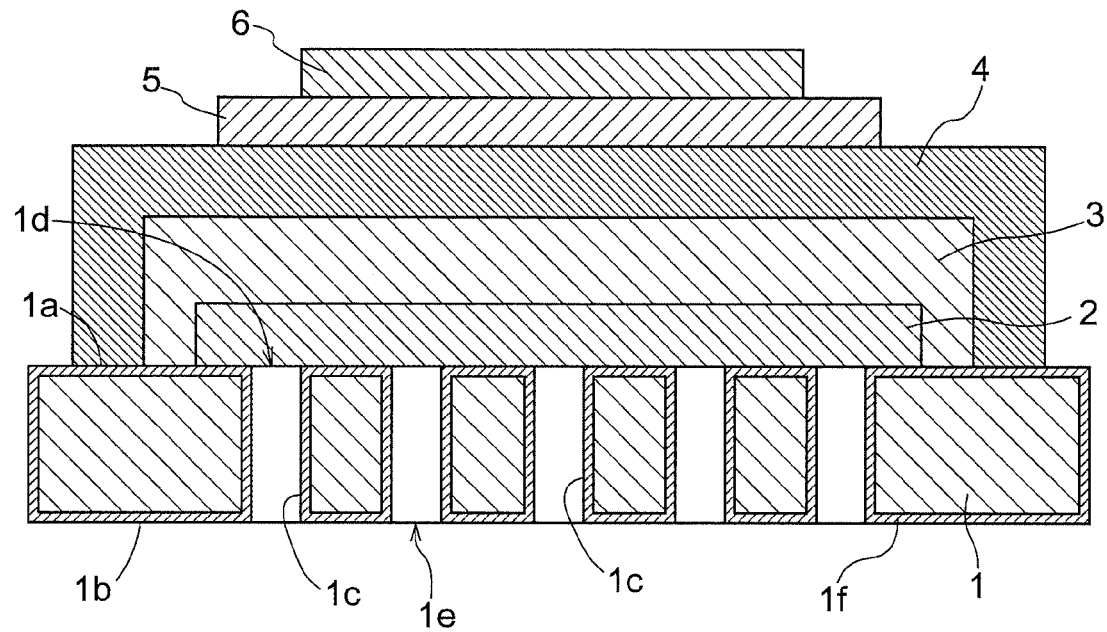
FIG. 1 is a schematic diagram showing a configuration of an electrochemical element.

As shown in FIG. 1, the electrochemical element E includes a metal support 1, an electrode layer 2 formed on the metal support 1, an intermediate layer 3 formed on the electrode layer 2, and an electrolyte layer 4 formed on the intermediate layer 3. The electrochemical element E further includes a reaction preventing layer 5 formed on the electrolyte layer 4, and a counter electrode layer 6 formed on the reaction preventing layer 5. Specifically, the counter electrode layer 6 is formed above the electrolyte layer 4, and the reaction preventing layer 5 is formed between the electrolyte layer 4 and the counter electrode layer 6. The electrode layer 2 is porous, and the electrolyte layer 4 is dense.

Metal Support

The metal support 1 supports the electrode layer 2, the intermediate layer 3, the electrolyte layer 4, and the like, and maintains the strength of the electrochemical element E. That is, the metal support 1 serves as a support that supports the electrochemical element E. In this embodiment, the metal support 1 has a warping degree of $1.5 \times 10^{-2}$ or less, and the electrode layer 2 and the like are appropriately formed on the metal support 1.

A material that has excellent electron conductivity, thermal resistance, oxidation resistance, and corrosion resistance is used as the material of the metal support 1. Examples thereof include ferrite-based stainless steel, austenite-based stainless steel, and a nickel-based alloy. In particular, an alloy containing chromium is favorably used. In this embodiment, the metal support 1 is made of a Fe—Cr based alloy that contains Cr in an amount of 18 mass % or more and 25 mass % or less, but a Fe—Cr based alloy that contains Mn in an amount of 0.05 mass % or more, a Fe—Cr based alloy that contains Ti in an amount of 0.15 mass % or more and 1.0 mass % or less, a Fe—Cr based alloy that contains Zr in an amount of 0.15 mass % or more and 1.0 mass % or less, a Fe—Cr based alloy that contains Ti and Zr, a total content of Ti and Zr being 0.15 mass % or more and 1.0 mass % or less, and a Fe—Cr based alloy that contains Cu in an amount of 0.10 mass % or more and 1.0 mass % or less are particularly favorable.

The metal support 1 has a plate shape as a whole. The metal support 1 is provided with a plurality of penetration spaces 1c that pass through the metal support 1 from the front face 1a, which is a face on which the electrode layer 2 is provided, to the back face 1b. The penetration space 1c allows gas to permeate from the back face 1b of the metal support 1 to the front face 1a thereof. It should be noted that a configuration is also possible in which the plate-like metal support 1 is deformed into, for example, a box shape, a cylindrical shape, or the like through bending or the like and used. There is no limitation on the shape of the plate face (front face 1a) of the metal support 1, and the plate face may also have a rectangular shape such as a square and a rectangle, a circular shape, or an elliptical shape.

A metal oxide layer 1f serving as a diffusion suppressing layer is provided on the surface of the metal support 1. That is, the diffusion suppressing layer is formed between the metal support 1 and the electrode layer 2, which will be described later. The metal oxide layer 1f is provided not only on the face of the metal support 1 exposed to the outside but also on the face (interface) that is in contact with the electrode layer 2. The metal oxide layer 1f can also be provided on the inner faces of the penetration spaces 1c. Element interdiffusion that occurs between the metal support 1 and the electrode layer 2 can be suppressed due to this metal oxide layer 1f. For example, when ferrite-based stainless steel containing chromium is used in the metal support 1, the metal oxide layer 1f is mainly made of a chromium oxide. The metal oxide layer 1f containing the chromium oxide as the main component suppresses diffusion of chromium atoms and the like of the metal support 1 to the electrode layer 2 and the electrolyte layer 4. The metal oxide layer 1f need only have such a thickness that allows both high diffusion preventing performance and low electric resistance to be achieved.

The metal oxide layer 1f can be formed using various techniques, but it is favorable to use a technique of oxidizing the surface of the metal support 1 to obtain a metal oxide. Also, the metal oxide layer if may be formed on the surface of the metal support 1 by using a spray coating technique (a technique such as thermal spraying technique, an aerosol deposition technique, an aerosol gas deposition technique, a powder jet deposition technique, a particle jet deposition technique, or a cold spraying technique), a PVD technique such as a sputtering technique or PLD technique, or a CVD technique, or may be formed by plating and oxidation treatment. Furthermore, the metal oxide layer if may also contain a spinel phase that has high electrical conductivity, or the like.

When a ferrite-based stainless steel material is used to form the metal support 1, its thermal expansion coefficient is close to that of YSZ (yttria-stabilized zirconia), GDC (gadolinium-doped ceria; also called CGO), or the like, which is used as the material of the electrode layer 2 and the electrolyte layer 4. Accordingly, even if low and high temperature cycling is repeated, the electrochemical element E is not likely to be damaged. Therefore, this is preferable due to being able to realize an electrochemical element E that has excellent long-term durability.

Next, the warping degree of the metal support 1 will be described with reference to FIGS. 6 and 7. The warping degree is an index of to what extent the metal support 1 is warped with respect to a flat face.

Figure 6:
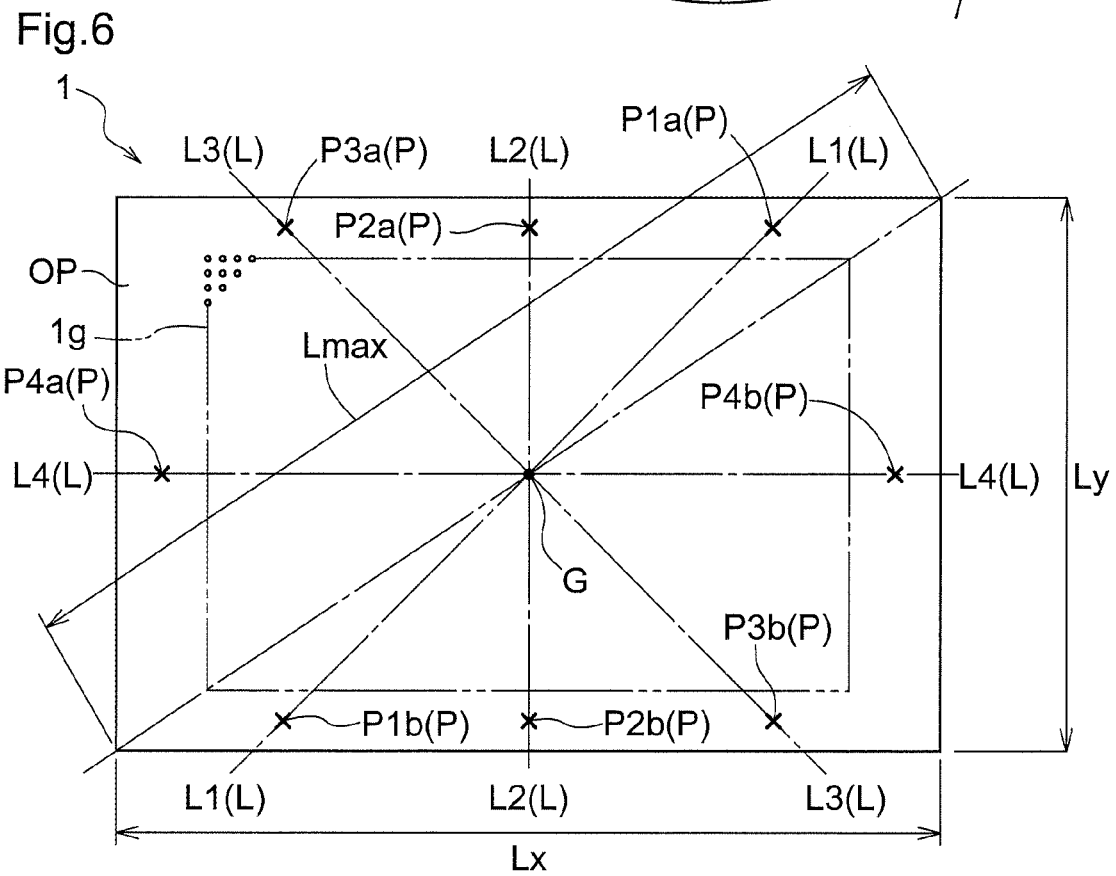
FIG. 6 is an explanatory diagram showing a method for calculating the warping degree of the metal support.

In the metal support 1 shown in FIG. 6, a center of gravity G of the metal support 1 is determined. The center of gravity G is a point at which the primary moment around the center of gravity G is zero when it is assumed that the metal support 1 is not provided with a hole region g1 and has a uniform thickness and uniform density. For example, when the plate face (front face 1a) of the metal support 1 has a rectangular shape such as a square or a rectangle, the center of gravity G is the intersection point of the diagonal lines. When the plate face has a circular shape, the center of gravity G is the center thereof. When the plate face has an elliptical shape, the center of gravity G is a point corresponding to the intersection point of the major axis and the minor axis.

Straight lines L1 to L4 indicate a plurality of straight lines that pass through the center of gravity G and radially extend. The straight lines L1 to L4 divide 360° by a predetermined angle around the center of gravity G. In FIG. 6, the straight lines L1 to L4 are drawn so as to be away from each other by 45°. It should be noted that the four straight lines L1 to L4 are drawn in this diagram, but the number of the straight lines L is not limited thereto and may also be one to three, or five or more. In addition, the angle dividing 360° is not limited to 45°, and may also be smaller than 45° or larger than 45°.

It is preferable that the plurality of straight lines passing through the center of gravity G of the metal support 1 radially extend while being away from each other by an angle of 90° or less around the center of gravity G because Da, which will be described later, can be calculated more accurately, and it is more preferable that the straight lines radially extend while being away from each other by an angle of 60° or less. Also, it is preferable that the plurality of straight lines passing through the center of gravity G of the metal support 1 radially extend while being away from each other by an angle of 30° or more around the center of gravity G because the warping can be easily measured.

Figure 5:
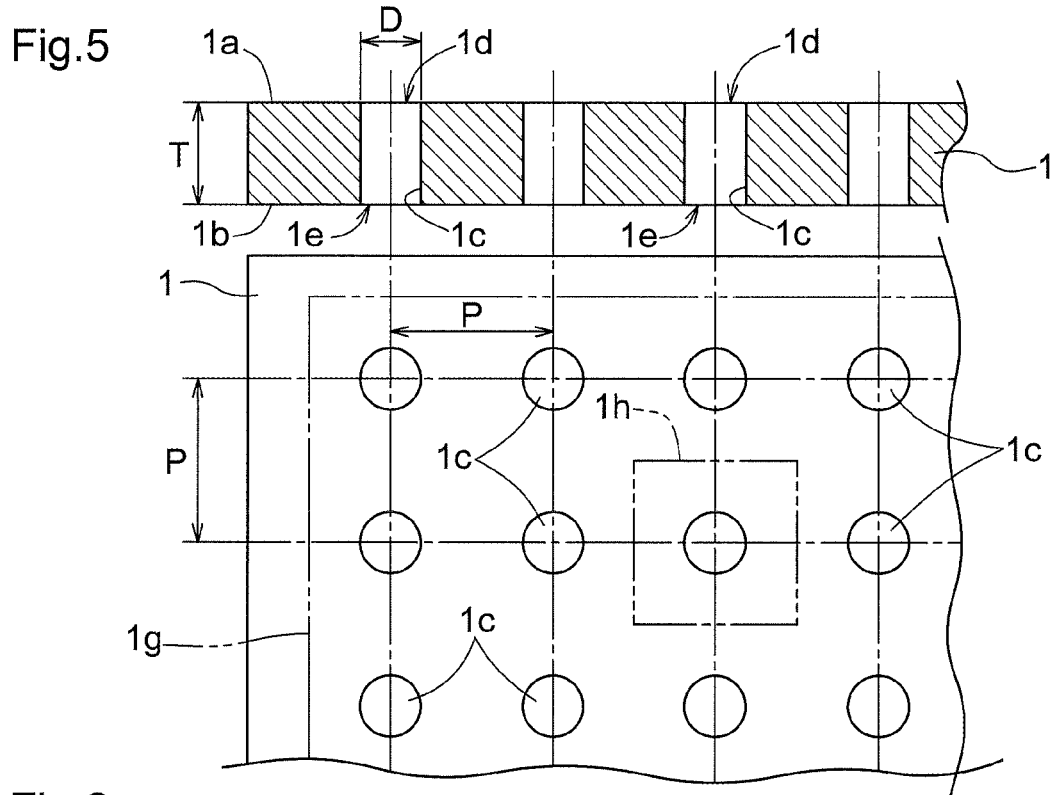
FIG. 5 shows a plan view and a cross-sectional view showing a structure of a metal support.

In each of the straight lines L1 to L4, two points P that are opposed to each other in the plate face of the metal support 1 with the center of gravity G being located at the center therebetween are extracted. The two points P that are opposed to each other are located in a region of a peripheral edge portion OP between the peripheral edge of the metal support 1 and the hole region g1 (FIG. 5). Here, eight points, namely points P1a and P1b on the straight line L1, points P2a and P2b on the straight line L2, points P3a and P3b on the straight line L3, and points P4a and P4b on the straight line L4, are extracted.

It should be noted that, in the description above, two points P that are opposed to each other with the center of gravity G being located at the center therebetween are extracted per straight line L, but three or more points P may also be extracted per straight line L.

The size of the hole region g1 varies depending on the metal support 1, and therefore, the size of the peripheral edge portion OP also varies depending on the metal support 1. For example, the peripheral edge portion OP can be set to have a size of about 20% or less from the peripheral edge of the metal support 1. For example, the peripheral edge portion OP corresponds to an area between the peripheral edge of the metal support 1 and the position away from the peripheral edge by about 20% or less of the distance between the peripheral edge of the metal support 1 and a straight line that passes through the center of gravity G and extends in parallel with the peripheral edge. Furthermore, the peripheral edge portion OP can be set to have a size of about 10% or less from the peripheral edge of the metal support 1, and can also be set to have a size of about 5% or less from the peripheral edge of the metal support 1.

The layers such as the electrode layer 2, the intermediate layer 3, the electrolyte layer 4, the reaction preventing layer 5, and the counter electrode layer 6 are placed on the metal support 1. The peripheral edge portion OP may also correspond to an area between the outer edge of any of these layers and the peripheral edge of the metal support 1.

Using the points P located in such a peripheral edge portion OP of the metal support 1 makes it possible to determine a least square plane α (least square value) (which will be described later) that is more typical of the shape of the metal support 1.

The least square plane α is determined through the least squares method using the eight points P, namely the points P1a to P4b, which has been extracted as mentioned above. The least square plane α is a plane that approximately indicates the range in which the points P1a to P4b are located. For example, the least square plane α is shown as a plane having a cross-section as shown in FIG. 7.

The positive-side maximum displacement value on the positive side (first side) with respect to the least square plane α, and the negative-side maximum displacement value on the negative side (second side) with respect to the least square plane α are determined. In this diagram, the point P3a that is the farthest from the least square plane α on the positive side is a positive-side maximum displacement point, and the distance between the least square plane α and the point P3a is taken as a positive-side maximum displacement value N1. Similarly, the point P2b that is the farthest from the least square plane α on the negative side is a negative-side maximum displacement point, and the distance between the least square plane α and the point P2b is taken as a negative-side maximum displacement value N2.

The difference between the positive-side maximum displacement point, which is the point P3a, and the least square plane α is taken as a first difference, and the first difference is the positive-side maximum displacement value N1. The difference between the negative-side maximum displacement point, which is the point P2b, and the least square plane α is taken as a second difference, and the second difference is the negative-side maximum displacement value N2. Da used as a reference for determining the warping degree of the metal support 1 is determined from the sum of the first difference and the second difference, namely the sum of the positive-side maximum displacement value N1 and the negative-side maximum displacement value N2.

Next, Da/Lmax, which is obtained by dividing Da by the maximum length Lmax of plate face of the metal support 1 is calculated as the warping degree. Here, as shown in FIG. 6, the lengths of the two sides of the metal support 1 having a rectangular shape are Lx and Ly, and the maximum length Lmax is determined as the square root of the sum of the square of Lx and the square of Ly.

In order to use the metal support 1 as a substrate for the electrochemical element E, the warping degree is preferably $1.5 \times 10^{-2}$ or less. The warping degree is more preferably $1.0 \times 10^{-2}$ or less, and the warping degree is even more preferably $5.0 \times 10^{-3}$ or less. As the warping degree is smaller, the electrode layer 2 and the like that each have a uniform thickness and reduced surface defects such as breakage and separation can also be formed on the metal support 1 as flat layers with increased adhesion therebetween.

Smoothing processing (e.g., leveler processing or annealing processing) may be performed in accordance with the warping degree of the metal support 1. It should be noted that performing smoothing processing on a metal support 1 having a warping degree of greater than $1.5 \times 10^{-2}$ is favorable.

When the size of the hole region 1g is $5.0 \times 10^2$ mm$^2$ or more, performing smoothing processing makes it easy to reduce the warping degree of the metal support 1 and is thus preferable. When the size of the hole region 1g is $2.5 \times 10^3$ mm$^2$ or more, performing smoothing processing increases the effect of reducing the warping degree and is thus more preferable.

As described above, the least square plane α is calculated using the points P that are located in a direction away from each other relative to the center of gravity G in the plate face of the metal support 1. For example, the points P are scattered over substantially the entire metal support 1. Accordingly, the least square plane α is determined based on the points P scattered in the plate face as a plane that approximates the shape of the plate face of the metal support 1. Thus, calculating Da based on differences from the least square plane and makes it possible to accurately determine the warping degree.

By further dividing Da by the maximum length Lmax of the metal support 1, even the warping degrees of metal supports 1 that are different in size can be compared based on a certain reference value. For example, when the metal support 1 is relatively large, Da tends to increase, but when the metal support 1 is relatively small, Da tends to decrease. Accordingly, it is preferable to divide Da by the maximum length Lmax so as to be capable of comparing the warping degrees based on a certain value among metal supports 1 that are different in size.

By accurately calculating a warping degree of the metal support 1 as described above and setting the warping degree to $1.5 \times 10^{-2}$ or less, a flat metal support 1 with reduced warping can be obtained. Since the metal support 1 itself is flat, the electrode layer 2, the electrolyte layer 4, the counter electrode layer 6, and the like can also be formed on the metal support 1 as flat layers. Accordingly, it is possible to suppress separation of these layers from the metal support 1, a decrease in adhesion between these layers, breakage of these layers, and the like.

When a plurality of layers including the electrode layer 2, the electrolyte layer 4, the counter electrode layer 6, and the like are formed on the metal support 1 to produce a cell, weight may be applied to the layers using a press or the like in order to bring the metal support 1 and the layers into more intimate contact with one another. As described above, the weight is substantially uniformly applied to the metal support 1 and the layers due to the reduced warping and flatness of the metal support 1. Accordingly, when weight is applied to the layers using a press or the like, separation and breakage of the layers, separation of the layers from the metal support 1, and the like are suppressed. Thus, a cell that has a uniform thickness, reduced surface defects such as breakage and separation, and increased adhesion between the layers can be produced. In addition, electrochemical reactions are efficiently performed between the layers, thus making it possible to improve the performance of the electrochemical element E.

It should be noted that the points P1a to P4b are located in the peripheral edge portion OP. The least square plane α is determined through the least squares method using such points P located in the peripheral edge portion OP. In general, the warping degree of the peripheral edge portion OP is larger than that of the central portion in the metal support 1. For example, when the area of the metal support 1 is relatively small, a difference in the warping degree between the central portion and the peripheral edge portion OP in the metal support 1 is not large, but when the area is increased, warping of the metal support 1 increases from the central portion toward the peripheral edge portion OP. Accordingly, calculating Da based on the points P located in the peripheral edge portion OP makes it possible to accurately calculate Da including the information of the entire metal support 1, and thus accurately calculate the warping degree of the metal support 1.

It should be noted that, in the description above, the least square plane α is determined using the eight points, namely the points P1a to P4b, but the least square plane α can be determined using at least four points located in the peripheral edge portion OP. In this case, it is preferable that points P located in a direction away from each other with respect to the center of gravity G in the plate face are used as the above-mentioned at least four points in the plate face because a least square plane α that approximates the shape of the plate face is calculated based on the points scattered in the plate face.

Also, it is preferable that the least square plane α is calculated through the least squares method using five or more points in the peripheral edge portion OP because more points in the plate face of the metal support 1 are used and thus Da can be accurately calculated. Also, it is preferable that the least square plane α is calculated through the least squares method using twelve or less points in the plate face because the warping degree can be easily measured.

Moreover, the least square plane α may also be determined based on any points located in the plate face of the metal support 1 other than the points P located in the peripheral edge portion OP.

Structures of Metal Support and Penetration Spaces

In the example shown in FIG. 1, the metal support 1 is constituted by a single metal plate. The metal support 1 can also be formed by stacking a plurality of metal plates. The metal support 1 can also be formed by stacking a plurality of metal plates that have the same thickness or substantially the same thickness. The metal support 1 can also be formed by stacking a plurality of metal plates that have different thicknesses. Hereinafter, examples of the structures of the metal support 1 and the penetration spaces 1c will be described with reference to the drawings. It should be noted that the metal oxide layer if is not shown.

An example in which the metal support 1 is constituted by a single metal plate will be described with reference to FIG. 5. As shown in FIG. 5, the metal support 1 is a plate-like member having a thickness T. That is, the metal support 1 has a plate shape as a whole. The metal support 1 is provided with the plurality of penetration spaces 1c that pass through the metal support 1 from the front face 1a to the back face 1b. In the first example, the penetration spaces 1c are holes with a circular cross section. The cross section of each of the penetration spaces 1c may also have a rectangular shape, a triangular shape, a polygonal shape, or the like other than a circular shape or a substantially circular shape. Various shapes can be selected as long as the penetration spaces 1c can be formed and the functions of the metal support 1 can be maintained. These holes (penetration spaces 1c) are formed in the metal support 1 through laser processing, punching processing, etching processing, or a combination thereof. The central axes of these holes are orthogonal to the metal support 1. It should be noted that the central axes of the holes (penetration spaces 1c) may be inclined to the metal support 1.

The openings of the penetration spaces 1c formed in the front face 1a are referred to as "front-side openings 1d". The openings of the penetration spaces 1c formed in the back face 1b are referred to as "back-side openings 1e". Since the penetration spaces 1c are holes having a circular cross section, all of the front-side openings 1d and the back-side openings 1e have a circular shape. The front-side openings 1d and the back-side openings 1e may have the same size. The back-side openings 1e may be larger than the front-side openings 1d. The diameter of each of the front-side openings 1d is taken as a "diameter D".

As shown in FIG. 5, in the metal support 1, the plurality of holes (penetration spaces 1c) are formed at positions corresponding to the lattice points of an orthogonal lattice at a pitch P (interval). The arrangement pattern of the plurality of holes (penetration spaces 1c) may be an orthorhombic lattice or an equilateral-triangular lattice other than the orthogonal lattice. The plurality of holes can be arranged at intersection points of the diagonal lines in addition to the lattice points. Various arrangement patterns can be selected as long as the penetration spaces can be formed and the functions of the metal support can be maintained.

A region of the front face 1a of the metal support 1 provided with the penetration spaces 1c is referred to as the "hole region 1g". The hole region 1g is provided in a region of the metal support 1 excluding the vicinity of the outer peripheral region. The metal support 1 may be provided with a single hole region 1g or a plurality of hole regions 1g.

The metal support 1 is required to have a strength that is sufficient to serve as a support for forming the electrochemical element E. The thickness T of the metal support 1 is preferably 0.1 mm or more, more preferably 0.15 mm or more, and even more preferably 0.2 mm or more. The thickness T of the metal support 1 is preferably 1.0 mm or less, more preferably 0.75 mm or less, and even more preferably 0.5 mm or less.

The diameter D of each of the front-side openings 1d is preferably 10 µm or more, more preferably 15 µm or more, and even more preferably 20 µm or more. The diameter D of each of the front-side openings 1d is preferably 60 µm or less, more preferably 50 µm or less, and even more preferably 40 µm or less.

The arrangement pitch P of the penetration spaces 1c (holes) is preferably 0.05 mm or more, more preferably 0.1 mm or more, and even more preferably 0.15 mm or more. The arrangement pitch P of the penetration spaces 1c (holes) is preferably 0.3 mm or less, more preferably 0.25 mm or less, and even more preferably 0.2 mm or less.

An area S of each of the front-side openings 1d of the penetration spaces 1c is preferably $7.0 \times 10^{-5}$ mm$^2$ or more, and preferably $3.0 \times 10^{-3}$ mm$^2$ or less.

Electrode Layer

As shown in FIG. 1, the electrode layer 2 can be provided as a thin layer in a region that is larger than the region provided with the penetration spaces 1c, on the front face of the metal support 1. When it is provided as a thin layer, the thickness can be set to approximately 1 μm to 100 μm, and preferably 5 μm to 50 μm, for example. This thickness makes it possible to ensure sufficient electrode performance while also achieving cost reduction by reducing the amount of expensive electrode layer material that is used. The region provided with the penetration spaces 1c is entirely covered by the electrode layer 2. That is, the penetration spaces 1c are formed inside the region of the metal support 1 in which the electrode layer 2 is formed. In other words, all the penetration spaces 1c are provided facing the electrode layer 2.

A composite material such as NiO-GDC, Ni-GDC, NiO—YSZ, Ni—YSZ, CuO—CeO$_2$, or Cu—CeO$_2$ can be used as the material for forming the electrode layer 2, for example. In these examples, GDC, YSZ, and CeO$_2$ can be called the aggregate of the composite material. It should be noted that it is preferable to form the electrode layer 2 using low-temperature calcining (not performing calcining treatment in a high temperature range of higher than 1100° C., but rather performing a wet process using calcining treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Due to these processes that can be used in a low temperature range, a favorable electrode layer 2 is obtained without using calcining in a high temperature range of higher than 1100° C., for example. Therefore, this is preferable due to being able to prevent damage to the metal support 1, suppress element interdiffusion between the metal support 1 and the electrode layer 2, and realize an electrochemical element that has excellent durability. Furthermore, using low-temperature calcining makes it possible to facilitate handling of raw materials and is thus more preferable.

The inside and the surface of the electrode layer 2 are provided with a plurality of pores in order to impart gas permeability to the electrode layer 2.

That is, the electrode layer 2 is formed as a porous layer. The electrode layer 2 is formed to have a denseness of 30% or more and less than 80%, for example. Regarding the size of the pores, a size suitable for smooth progress of an electrochemical reaction can be selected as appropriate. It should be noted that the "denseness" is a ratio of the material of the layer to the space and can be represented by a formula "1—porosity", and is equivalent to relative density.

Intermediate Layer

As shown in FIG. 1, the intermediate layer 3 (intervening layer) can be formed as a thin layer on the electrode layer 2 so as to cover the electrode layer 2. When it is formed as a thin layer, the thickness can be set to approximately 1 μm to 100 μm, preferably approximately 2 μm to 50 μm, and more preferably approximately 4 μm to 25 μm, for example. This thickness makes it possible to ensure sufficient performance while also achieving cost reduction by reducing the amount of expensive intermediate layer material that is used. YSZ (yttria-stabilized zirconia), SSZ (scandia-stabilized zirconia), GDC (gadolinium-doped ceria), YDC (yttrium-doped ceria), SDC (samarium-doped ceria), or the like can be used as the material of the intermediate layer 3. In particular, ceria-based ceramics are favorably used.

It is preferable to form the intermediate layer 3 using low-temperature calcining (not performing calcining treatment in a high temperature range of higher than 1100° C., but rather performing a wet process using calcining treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Due to these film formation processes that can be used in a low temperature range, an intermediate layer 3 is obtained without using calcining in a high temperature range of higher than 1100° C., for example. Therefore, it is possible to prevent damage to the metal support 1, suppress element interdiffusion between the metal support 1 and the electrode layer 2, and realize an electrochemical element E that has excellent durability. Furthermore, using low-temperature calcining makes it possible to facilitate handling of raw materials and is thus more preferable.

It is preferable that the intermediate layer 3 has oxygen ion (oxide ion) conductivity. It is more preferable that the intermediate layer 3 has both oxygen ion (oxide ion) conductivity and electron conductivity, namely mixed conductivity. The intermediate layer 3 that has these properties is suitable for application to the electrochemical element E.

Electrolyte Layer

As shown in FIG. 1, the electrolyte layer 4 is formed as a thin layer on the intermediate layer 3 so as to cover the electrode layer 2 and the intermediate layer 3. The electrolyte layer 4 can also be formed as a thin film having a thickness of 10 μm or less. Specifically, as shown in FIG. 1, the electrolyte layer 4 is provided on both the intermediate layer 3 and the metal support 1 (spanning the intermediate layer 3 and the metal support 1). Configuring the electrolyte layer 4 in this manner and joining the electrolyte layer 4 to the metal support 1 make it possible to allow the electrochemical element to have excellent toughness as a whole.

Also, as shown in FIG. 1, the electrolyte layer 4 is provided in a region that is larger than the region provided with the penetration spaces 1c, on the front face of the metal support 1. That is, the penetration spaces 1c are formed inside the region of the metal support 1 in which the electrolyte layer 4 is formed.

The leakage of gas from the electrode layer 2 and the intermediate layer 3 can be suppressed in the vicinity of the electrolyte layer 4. A description of this will be given. When the electrochemical element E is used as a constitutional element of a SOFC, gas is supplied from the back side of the metal support 1 through the penetration spaces 1c to the electrode layer 2 during the operation of the SOFC. In a region where the electrolyte layer 4 is in contact with the metal support 1, leakage of gas can be suppressed without providing another member such as a gasket. It should be noted that, although the entire vicinity of the electrode layer 2 is covered by the electrolyte layer 4 in this embodiment, a configuration in which the electrolyte layer 4 is provided on the electrode layer 2 and the intermediate layer 3 and a gasket or the like is provided in its vicinity may also be adopted.

YSZ (yttria-stabilized zirconia), SSZ (scandia-stabilized zirconia), GDC (gadolinium-doped ceria), YDC (yttrium-doped ceria), SDC (samarium-doped ceria), LSGM (strontium- and magnesium-doped lanthanum gallate), or the like can be used as the material of the electrolyte layer 4. In particular, zirconia-based ceramics are favorably used. Using zirconia-based ceramics for the electrolyte layer 4 makes it possible to increase the operation temperature of the SOFC in which the electrochemical element E is used compared with the case where ceria-based ceramics are used. For example, when the electrochemical element E is used in the SOFC, by adopting a system configuration in which a material such as YSZ that can exhibit high electrolyte performance even in a high temperature range of approximately 650° C. or higher is used as the material of the electrolyte layer 4, a hydrocarbon-based raw fuel such as city gas or LPG is used as the raw fuel for the system, and the raw fuel is reformed into anode gas of the SOFC through steam reforming or the like, it is thus possible to construct a high-efficiency SOFC system in which heat generated in a cell stack of the SOFC is used to reform raw fuel gas.

It is preferable to form the electrolyte layer 4 using low-temperature calcining (not performing calcining treatment in a high temperature range of higher than 1100° C., but rather performing a wet process using calcining treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Due to these film formation processes that can be used in a low temperature range, an electrolyte layer 4 that is dense and has high gas-tightness and gas barrier properties is obtained without using calcining in a high temperature range of higher than 1100° C., for example. Therefore, it is possible to prevent damage to the metal support 1, suppress element interdiffusion between the metal support 1 and the electrode layer 2, and realize an electrochemical element E that has excellent performance and durability. In particular, using low-temperature calcining, a spray coating technique, or the like makes it possible to realize a low-cost element and is thus preferable. Furthermore, using a spray coating technique makes it easy to obtain, in a low temperature range, an electrolyte layer that is dense and has high gas-tightness and gas barrier properties, and is thus more preferable.

The electrolyte layer 4 is given a dense configuration in order to block gas leakage of anode gas and cathode gas and exhibit high ion conductivity. The electrolyte layer 4 preferably has a denseness of 90% or more, more preferably 95% or more, and even more preferably 98% or more. When the electrolyte layer 4 is formed as a uniform layer, the denseness is preferably 95% or more, and more preferably 98% or more. When the electrolyte layer 4 has a multilayer configuration, at least a portion thereof preferably includes a layer (dense electrolyte layer) having a denseness of 98% or more, and more preferably a layer (dense electrolyte layer) having a denseness of 99% or more. The reason for this is that an electrolyte layer that is dense and has high gas-tightness and gas barrier properties can be easily formed due to such a dense electrolyte layer being included as a portion of the electrolyte layer even when the electrolyte layer has a multilayer configuration.

Reaction Preventing Layer

The reaction preventing layer 5 can be formed as a thin layer on the electrolyte layer 4. When it is formed as a thin layer, the thickness can be set to approximately 1 μm to 100 μm, preferably approximately 2 μm to 50 μm, and more preferably approximately 3 μm to 15 μm, for example. This thickness makes it possible to ensure sufficient performance while also achieving cost reduction by reducing the amount of expensive reaction preventing layer material that is used. The material of the reaction preventing layer 5 need only be capable of preventing reactions between the component of the electrolyte layer 4 and the component of the counter electrode layer 6. For example, a ceria-based material or the like is used. Materials that contain at least one element selected from the group consisting of Sm, Gd, and Y are favorably used as the material of the reaction preventing layer 5. It is preferable that at least one element selected from the group consisting of Sm, Gd, and Y is contained, and the total content of these elements is 1.0 mass % or more and 10 mass % or less. Introducing the reaction preventing layer 5 between the electrolyte layer 4 and the counter electrode layer 6 effectively suppresses reactions between the material constituting the counter electrode layer 6 and the material constituting the electrolyte layer 4 and makes it possible to improve long-term stability in the performance of the electrochemical element E. Forming the reaction preventing layer 5 using, as appropriate, a method through which the reaction preventing layer 5 can be formed at a treatment temperature of 1100° C. or lower makes it possible to suppress damage to the metal support 1, suppress element interdiffusion between the metal support 1 and the electrode layer 2, and realize an electrochemical element E that has excellent performance and durability, and is thus preferable. For example, the reaction preventing layer 5 can be formed using, as appropriate, low-temperature calcining (not performing calcining treatment in a high temperature range of higher than 1100° C., but rather performing a wet process using calcining treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. In particular, using low-temperature calcining, a spray coating technique, or the like makes it possible to realize a low-cost element and is thus preferable. Furthermore, using low-temperature calcining makes it possible to facilitate handling of raw materials and is thus more preferable.

Counter Electrode Layer

The counter electrode layer 6 can be formed as a thin layer on the electrolyte layer 4 or the reaction preventing layer 5. When it is formed as a thin layer, the thickness can be set to approximately 1 μm to 100 μm, and preferably approximately 5 μm to 50 μm, for example. This thickness makes it possible to ensure sufficient electrode performance while also achieving cost reduction by reducing the amount of expensive counter electrode layer material that is used. A complex oxide such as LSCF or LSM, or a ceria-based oxide, or a mixture thereof can be used as the material of the counter electrode layer 6, for example. In particular, it is preferable that the counter electrode layer 6 includes a perovskite oxide containing two or more elements selected from the group consisting of La, Sr, Sm, Mn, Co, and Fe. The counter electrode layer 6 constituted by the above-mentioned material functions as a cathode.

It should be noted that forming the counter electrode layer 6 using, as appropriate, a method through which the counter electrode layer 6 can be formed at a treatment temperature of 1100° C. or lower makes it possible to suppress damage to the metal support 1, suppress element interdiffusion between the metal support 1 and the electrode layer 2, and realize an electrochemical element E that has excellent performance and durability, and is thus preferable. For example, the counter electrode layer 6 can be formed using, as appropriate, low-temperature calcining (not performing calcining treatment in a high temperature range of higher than 1100° C., but rather performing a wet process using calcining treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. In particular, using low-temperature calcining, a spray coating technique, or the like makes it possible to realize a low-cost element and is thus preferable. Furthermore, using low-temperature calcining makes it possible to facilitate handling of raw materials and is thus more preferable.

Solid Oxide Fuel Cell

The electrochemical element E configured as described above can be used as a power generating cell for a solid oxide fuel cell. For example, fuel gas containing hydrogen is supplied from the back surface of the metal support 1 through the penetration spaces 1c to the electrode layer 2, air is supplied to the counter electrode layer 6 serving as a counter electrode of the electrode layer 2, and the operation is performed at a temperature of 500° C. or higher and 900° C. or lower, for example. Accordingly, the oxygen $O_2$ included in air reacts with electrons $e^-$ in the counter electrode layer 6, thus producing oxygen ions $O^{2-}$. The oxygen ions $O^{2-}$ move through the electrolyte layer 4 to the electrode layer 2. In the electrode layer 2, the hydrogen $H_2$ included in the supplied fuel gas reacts with the oxygen ions $O^{2-}$, thus producing water $H_2O$ and electrons $e^-$. With these reactions, electromotive force is generated between the electrode layer 2 and the counter electrode layer 6. In this case, the electrode layer 2 functions as a fuel electrode (anode) of the SOFC, and the counter electrode layer 6 functions as an air electrode (cathode).

Method for Manufacturing Electrochemical Element

Next, a method for manufacturing the electrochemical element E will be described.

Electrode Layer Forming Step

In an electrode layer forming step, the electrode layer 2 is formed as a thin film in a region that is broader than the region provided with the penetration spaces 1c, on the front face of the metal support 1. The through holes of the metal support 1 can be provided through laser processing or the like. As described above, the electrode layer 2 can be formed using low-temperature calcining (a wet process using calcining treatment in a low temperature range of 1100° C. or lower), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the metal support 1.

The following is a specific example of the case where low-temperature calcining is performed as the electrode layer forming step.

First, a material paste is produced by mixing powder of the material of the electrode layer 2 and a solvent (dispersion medium), and is applied to the front face of the metal support 1. Then, the electrode layer 2 is obtained through compression molding (electrode layer smoothing step) and calcining at a temperature of 1100° C. or lower (electrode layer calcining step). Examples of compression molding of the electrode layer 2 include CIP (Cold Isostatic Pressing) molding, roll pressing molding, and RIP (Rubber Isostatic Pressing) molding. It is favorable to perform calcining of the electrode layer 2 at a temperature of 800° C. or higher and 1100° C. or lower. The order in which the electrode layer smoothing step and the electrode layer calcining step are performed can be changed.

It should be noted that, when an electrochemical element including an intermediate layer 3 is formed, the electrode layer smoothing step and the electrode layer calcining step may be omitted, and an intermediate layer smoothing step and an intermediate layer calcining step, which will be described later, may include the electrode layer smoothing step and the electrode layer calcining step.

It should be noted that lapping molding, leveling treatment, surface cutting treatment, surface polishing treatment, or the like can also be performed as the electrode layer smoothing step.

Diffusion Suppressing Layer Forming Step

The metal oxide layer 1f (diffusion suppressing layer) is formed on the surface of the metal support 1 during the calcining step in the above-described electrode layer forming step. It should be noted that it is preferable that the above-mentioned calcining step includes a calcining step in which the calcining atmosphere satisfies the atmospheric condition that the oxygen partial pressure is low because a high-quality metal oxide layer 1f (diffusion suppressing layer) that has a high element interdiffusion suppressing effect and has a low resistance value is formed. In a case where a coating method that does not include calcining is performed as the electrode layer forming step, a separate diffusion suppressing layer forming step may also be included. In any case, it is desirable to perform these steps at a temperature of 1100° C. or lower such that damage to the metal support 1 can be suppressed. The metal oxide layer 1f (diffusion suppressing layer) may be formed on the surface of the metal support 1 during the calcining step in an intermediate layer forming step, which will be described later.

Intermediate Layer Forming Step

In an intermediate layer forming step, the intermediate layer 3 is formed as a thin layer on the electrode layer 2 so as to cover the electrode layer 2. As described above, the intermediate layer 3 can be formed using low-temperature calcining (a wet process using calcining treatment in a low temperature range of 1100° C. or lower), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the metal support 1.

The following is a specific example of the case where low-temperature calcining is performed as the intermediate layer forming step.

First, a material paste is produced by mixing powder of the material of the intermediate layer 3 and a solvent (dispersion medium), and is applied to the front face of the metal support 1. Then, the intermediate layer 3 is obtained through compression molding (intermediate layer smoothing step) and calcining at a temperature of 1100° C. or lower (intermediate layer calcining step). Examples of rolling of the intermediate layer 3 include CIP (Cold Isostatic Pressing) molding, roll pressing molding, and RIP (Rubber Isostatic Pressing) molding. It is favorable to perform calcining of the intermediate layer 3 at a temperature of 800° C. or higher and 1100° C. or lower. The reason for this is that this temperature makes it possible to form an intermediate layer 3 that has high strength while suppressing damage to and deterioration of the metal support 1. It is more preferable to perform calcining of the intermediate layer 3 at a temperature of 1050° C. or lower, and more preferably 1000° C. or lower. The reason for this is that the lower the calcining temperature of the intermediate layer 3 is, the more likely it is to further suppress damage to and deterioration of the metal support 1 when forming the electrochemical element E. The order in which the intermediate layer smoothing step and the intermediate layer calcining step are performed can be changed.

It should be noted that lapping molding, leveling treatment, surface cutting treatment, surface polishing treatment, or the like can also be performed as the intermediate layer smoothing step.

Electrolyte Layer Forming Step

In an electrolyte layer forming step, the electrolyte layer 4 is formed as a thin layer on the intermediate layer 3 so as to cover the electrode layer 2 and the intermediate layer 3. The electrolyte layer 4 may also be formed as a thin film having a thickness of 10 μm or less. As described above, the electrolyte layer 4 can be formed using low-temperature calcining (a wet process using calcining treatment in a low temperature range of 1100° C. or lower), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the metal support 1.

It is desirable to perform a spray coating technique as the electrolyte layer forming step in order to form a high-quality electrolyte layer 4 that is dense and has high gas-tightness and gas barrier properties in a temperature range of 1100° C. or lower. In this case, the material of the electrolyte layer 4 is sprayed onto the intermediate layer 3 on the metal support 1, and the electrolyte layer 4 is thus formed.

Reaction Preventing Layer Forming Step

In a reaction preventing layer forming step, the reaction preventing layer 5 is formed as a thin layer on the electrolyte layer 4. As described above, the reaction preventing layer 5 can be formed using low-temperature calcining (a wet process using calcining treatment in a low temperature range of 1100° C. or lower), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the metal support 1. It should be noted that leveling treatment, surface cutting treatment, or surface polishing treatment may be performed after the formation of the reaction preventing layer 5, or pressing processing may be performed after wet formation and before calcining in order to flatten the top face of the reaction preventing layer 5.

Counter Electrode Layer Forming Step

In a counter electrode layer forming step, the counter electrode layer 6 is formed as a thin layer on the reaction preventing layer 5. As described above, the counter electrode layer 6 can be formed using low-temperature calcining (a wet process using calcining treatment in a low temperature range of 1100° C. or lower), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the metal support 1.

In this manner, the electrochemical element E can be manufactured.

It should be noted that a configuration is also possible in which the electrochemical element E does not include both or either of the intermediate layer 3 (intervening layer) and the reaction preventing layer 5. That is, a configuration is also possible in which the electrode layer 2 and the electrolyte layer 4 are in contact with each other, or a configuration is also possible in which the electrolyte layer 4 and the counter electrode layer 6 are in contact with each other. In this case, in the above-described manufacturing method, the intermediate layer forming step and the reaction preventing layer forming step are omitted. It should be noted that it is also possible to add a step of forming another layer or to form a plurality of layers of the same type one on top of another, but in any case, it is desirable to perform these steps at a temperature of 1100° C. or lower.

120-mm Square Test Piece

Comparative Example 1

A 120-mm square (120 mm×120 mm) crofer 22 APU metal plate having a thickness of 0.3 mm was provided with a plurality of penetration spaces 1c through laser processing in a 98-mm square (98 mm×98 mm) region around the center, and a metal plate (metal support 1) according to Comparative Example 1 was thus produced. The penetration spaces 1c were provided at positions corresponding to the lattice points of an orthogonal lattice. It should be noted that each of the front-side openings 1d had a diameter of 20 μm, and the pitch P was 200 μm. The maximum length Lmax was 16.97 cm.

Comparative Example 2

A metal plate (metal support 1) according to Comparative Example 2 in which the pitch P of the front-side openings 1d was 150 μm (each of the front-side openings 1d had a diameter of 25 μm) was produced in the same manner as in Comparative Example 1.

Working Example 1

A metal plate (metal support 1) according to Working Example 1 was produced by performing leveler processing on a metal plate (metal support 1) as that in Comparative Example 1 to smooth the metal plate.

Working Example 2

A metal plate (metal support 1) according to Working Example 2 was produced by performing annealing processing on a metal plate (metal support 1) as that in Comparative Example 2 to smooth the metal plate.

40-mm Square Test Piece

Working Example 3

A 40-mm square (40 mm×40 mm) crofer 22 APU metal plate having a thickness of 0.3 mm was provided with a plurality of penetration spaces 1c through laser processing in a 28-mm square (28 mm×28 mm) region around the center, and a metal plate (metal support 1) according to Working Example 3 was thus produced. The penetration spaces 1c were provided at positions corresponding to the lattice points of an orthogonal lattice. It should be noted that each of the front-side openings 1d had a diameter of 25 μm, and the pitch P was 150 μm. The maximum length Lmax was 5.66 cm.

Next, a paste to be used for the above-mentioned metal plates of Comparative Examples 1 and 2 and Working Examples 1 to 3 was produced by mixing 60 wt % of NiO powder and 40 wt % of YSZ powder and adding an organic binder and an organic solvent (dispersion medium) thereto. An attempt was made to form the electrode layer 2 through screen printing. In the case of Comparative Examples 1 and 2 and Working Examples 1 and 2, the screen printing was performed on a 105-mm square region around the center on the surface of the metal support 1. In the case of Working Example 3, the screen printing was performed on a 30-mm square region around the center on the surface of the metal support 1.

The warping degrees of the above-mentioned comparative examples and working examples were measured using the method described in the above-mentioned embodiment. In the comparative examples (Comparative Examples 1 and 2) and Examples 1 and 2, eight points that were located away from the peripheral edge of the metal support 1 by 5% of a distance between the peripheral edge of the metal support 1 and a straight line that passes through the center of gravity G and extends in parallel with the peripheral edge were used, and in Example 3, eight points that were located away from the peripheral edge of the metal support 1 by 15% of the above-described distance were used. Regarding the comparative examples and working examples, the result of whether or not the electrode layer 2 was formed was determined. Table 1 shows the measurement results and determination results.

Table 1 est warping degree among the comparative examples, the warping degree of the metal support 1 was $2.1 \times 10^{-2}$.

On the other hand, in all of the working examples (Working Examples 1, 2, and 3), the warping degree of the metal support 1 was small, and surface defects such as breakage and separation were reduced. Accordingly, an electrode layer 2 that can be used in the electrochemical element E could be formed. In Working Example 3, which had the largest warping degree among these working examples, the warping degree of the metal support 1 was $1.1 \times 10^{-2}$.

It was revealed from these results that, when the warping degree of the metal support 1 is $1.5 \times 10^{-2}$ or less, an electrode layer 2 having reduced surface defects such as breakage and separation can be formed on the metal support 1.

It should be noted that, in Example 3, the intermediate layer 3, the electrolyte layer 4, the reaction preventing layer 5, and the counter electrode layer 6 were formed after the electrode layer 2 had been formed, and the electrochemical element E was thus produced. In the produced electrochemical element E, fuel gas (30° C. humidified $H_2$) and air were supplied to the electrode layer 2 and the counter electrode layer 6, respectively, and OCV (open circuit voltage), which is one of the indices of the power generation performance of a cell for a solid oxide fuel cell, was measured at an operation temperature of 750° C. As a result, the OCV of the electrochemical element E of Working Example 3 was 1.02 V. It was revealed from this result that the electrochemical element E of Working Example 3 had a large OCV (open circuit voltage) and was thus favorable.

Second Embodiment

An electrochemical element E, an electrochemical module M, an electrochemical device Y, and an energy system Z according to a second embodiment will be described with reference to FIGS. 2 and 3.

Figure 2:
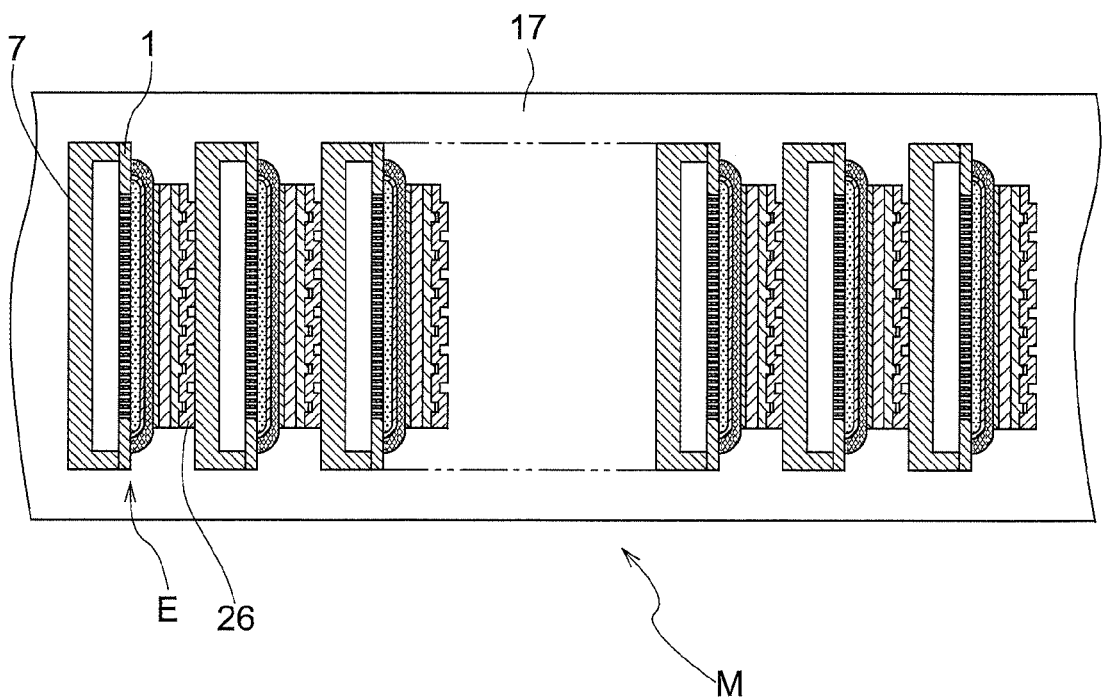
FIG. 2 is a schematic diagram showing configurations of electrochemical elements and an electrochemical module.

As shown in FIG. 2, in the electrochemical element E according to the second embodiment, a U-shaped member 7

TABLE 1

| | Sample shape | Hole diameter (μm) | Pitch (μm) | Maximum straight line length L (cm) | Da value (mm) | Warping degree | Determination (whether or not electrode layer 2 was formed) |
|---|---|---|---|---|---|---|---|
| Comp. Ex. 1 | 12-cm square | 20 | 200 | 16.97 | 3.619 | $2.1 \times 10^{-2}$ | No |
| Comp. Ex. 2 | 12-cm square | 25 | 150 | 16.97 | 3.949 | $2.3 \times 10^{-2}$ | No |
| Work. Ex. 1 | 12-cm square | 20 | 200 | 16.97 | 1.451 | $8.6 \times 10^{-3}$ | Yes |
| Work. Ex. 2 | 12-cm square | 25 | 150 | 16.97 | 0.709 | $4.2 \times 10^{-3}$ | Yes |
| Work. Ex. 3 | 4-cm square | 25 | 150 | 5.66 | 0.659 | $1.1 \times 10^{-2}$ | Yes |

As is clear from the results shown in Table 1, in both of the comparative examples (Comparative Examples 1 and 2), the warping degree of the metal support 1 was large, and poor printing and surface defects such as separation and breakage occurred in the formed electrode layer 2. Accordingly, an electrode layer 2 that can be used in the electrochemical element E could not be formed on the metal support 1. In Comparative Example 1, which had the smallis attached to the back face of the metal support 1, and the metal support 1 and the U-shaped member 7 form a tubular support.

The electrochemical module M is configured by stacking a plurality of electrochemical elements E with collector members 26 being sandwiched therebetween. Each of the collector members 26 is joined to the counter electrode layer 6 of the electrochemical element E and the U-shaped member 7, and electrically connects them.

The electrochemical module M includes a gas manifold 17, the collector members 26, a terminal member, and a current extracting unit. One open end of each tubular support in the stack of the plurality of electrochemical elements E is connected to the gas manifold 17, and gas is supplied from the gas manifold 17 to the electrochemical elements E. The supplied gas flows inside the tubular supports, and is supplied to the electrode layers 2 through the penetration spaces 1 of the metal supports 1.

Figure 3:
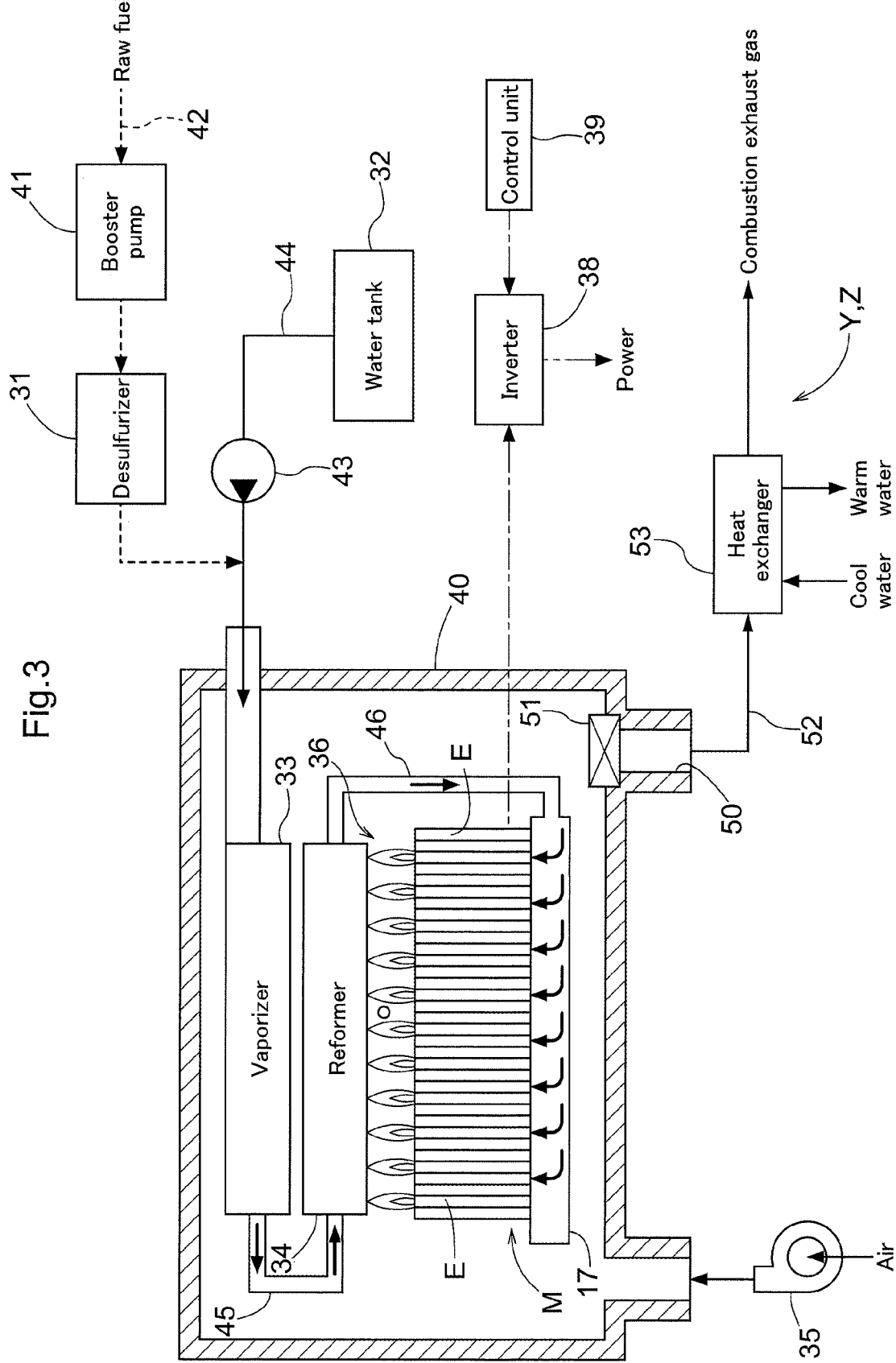
FIG. 3 is a schematic diagram showing configurations of an electrochemical device and an energy system.

FIG. 3 shows an overview of the energy system Z and the electrochemical device Y.

The energy system Z includes the electrochemical device Y, and a heat exchanger 53 serving as a waste heat utilization system that reuses heat discharged from the electrochemical device Y.

The electrochemical device Y includes the electrochemical module M, a desulfurizer 31 and a reformer 34 and includes a fuel supply unit that supplies fuel gas containing a reducing component to the electrochemical module M, and an inverter 38 that extracts power from the electrochemical module M.

Specifically, the electrochemical device Y includes the desulfurizer 31, a water tank 32, a vaporizer 33, the reformer 34, a blower 35, a combustion unit 36, the inverter 38, a control unit 39, a storage container 40, and the electrochemical module M.

The desulfurizer 31 removes sulfur compound components contained in a hydrocarbon-based raw fuel such as city gas (i.e., performs desulfurization). When a sulfur compound is contained in the raw fuel, the inclusion of the desulfurizer 31 makes it possible to suppress the influence that the sulfur compound has on the reformer 34 or the electrochemical elements E. The vaporizer 33 produces water vapor (steam) from water supplied from the water tank 32. The reformer 34 uses the water vapor (steam) produced by the vaporizer 33 to perform steam reforming of the raw fuel desulfurized by the desulfurizer 31, thus producing reformed gas containing hydrogen.

The electrochemical module M generates power by causing an electrochemical reaction to occur with use of the reformed gas supplied from the reformer 34 and air supplied from the blower 35. The combustion unit 36 mixes the reaction exhaust gas discharged from the electrochemical module M with air, and burns combustible components in the reaction exhaust gas.

The electrochemical module M includes a plurality of electrochemical elements E and the gas manifold 17. The electrochemical elements E are arranged side-by-side and electrically connected to each other, and one end portion (lower end portion) of each of the electrochemical elements E is fixed to the gas manifold 17. The electrochemical elements E generate power by causing an electrochemical reaction to occur between the reformed gas supplied via the gas manifold 17 and air supplied from the blower 35.

The inverter 38 adjusts the power output from the electrochemical module M to obtain the same voltage and frequency as electrical power received from a commercial system (not shown). The control unit 39 controls the operation of the electrochemical device Y and the energy system Z.

The vaporizer 33, the reformer 34, the electrochemical module M, and the combustion unit 36 are stored in the storage container 40. The reformer 34 performs reforming process on the raw fuel with use of combustion heat produced by the combustion of reaction exhaust gas in the combustion unit 36.

The raw fuel is supplied to the desulfurizer 31 via a raw fuel supply passage 42, due to operation of a booster pump 41. The water in the water tank 32 is supplied to the vaporizer 33 via a water supply passage 44, due to operation of a water pump 43. The raw fuel supply passage 42 merges with the water supply passage 44 at a location on the downstream side of the desulfurizer 31, and the water and the raw fuel, which have been merged outside of the storage container 40, are supplied to the vaporizer 33 provided in the storage container 40.

The water is vaporized by the vaporizer 33 to produce water vapor. The raw fuel, which contains the water vapor produced by the vaporizer 33, is supplied to the reformer 34 via a water vapor-containing raw fuel supply passage 45. In the reformer 34, the raw fuel is subjected to steam reforming, thus producing reformed gas that includes hydrogen gas as a main component (first gas including a reducing component). The reformed gas produced in the reformer 34 is supplied to the gas manifold 17 of the electrochemical module M via a reformed gas supply passage 46.

The reformed gas supplied to the gas manifold 17 is distributed among the electrochemical elements E, and is supplied to the electrochemical elements E from the lower ends, which are the connection portions where the electrochemical elements E and the gas manifold 17 are connected to each other. Mainly the hydrogen (reducing component) in the reformed gas is used in the electrochemical reaction in the electrochemical elements E. The reaction exhaust gas, which contains remaining hydrogen gas not used in the reaction, is discharged from the upper ends of the electrochemical elements E to the combustion unit 36.

The reaction exhaust gas is burned in the combustion unit 36, and combustion exhaust gas is discharged from a combustion exhaust gas outlet 50 to the outside of the storage container 40. A combustion catalyst unit 51 (e.g., a platinum-based catalyst) is provided in the combustion exhaust gas outlet 50, and reducing components such as carbon monoxide and hydrogen contained in the combustion exhaust gas are removed by combustion. The combustion exhaust gas discharged from the combustion exhaust gas outlet 50 is sent to the heat exchanger 53 via a combustion exhaust gas discharge passage 52.

The heat exchanger 53 uses supplied cool water to perform heat exchange on the combustion exhaust gas produced by combustion in the combustion unit 36, thus producing warm water. In other words, the heat exchanger 53 operates as a waste heat utilization system that reuses heat discharged from the electrochemical device Y.

It should be noted that instead of the waste heat utilization system, it is possible to provide a reaction exhaust gas using unit that uses the reaction exhaust gas that is discharged from (not burned in) the electrochemical module M. The reaction exhaust gas contains remaining hydrogen gas that was not used in the reaction in the electrochemical elements E. In the reaction exhaust gas using unit, the remaining hydrogen gas is used to perform heat utilization through combustion or power generation by a fuel cell and so on, thus achieving effective energy utilization.

Third Embodiment

Figure 4:
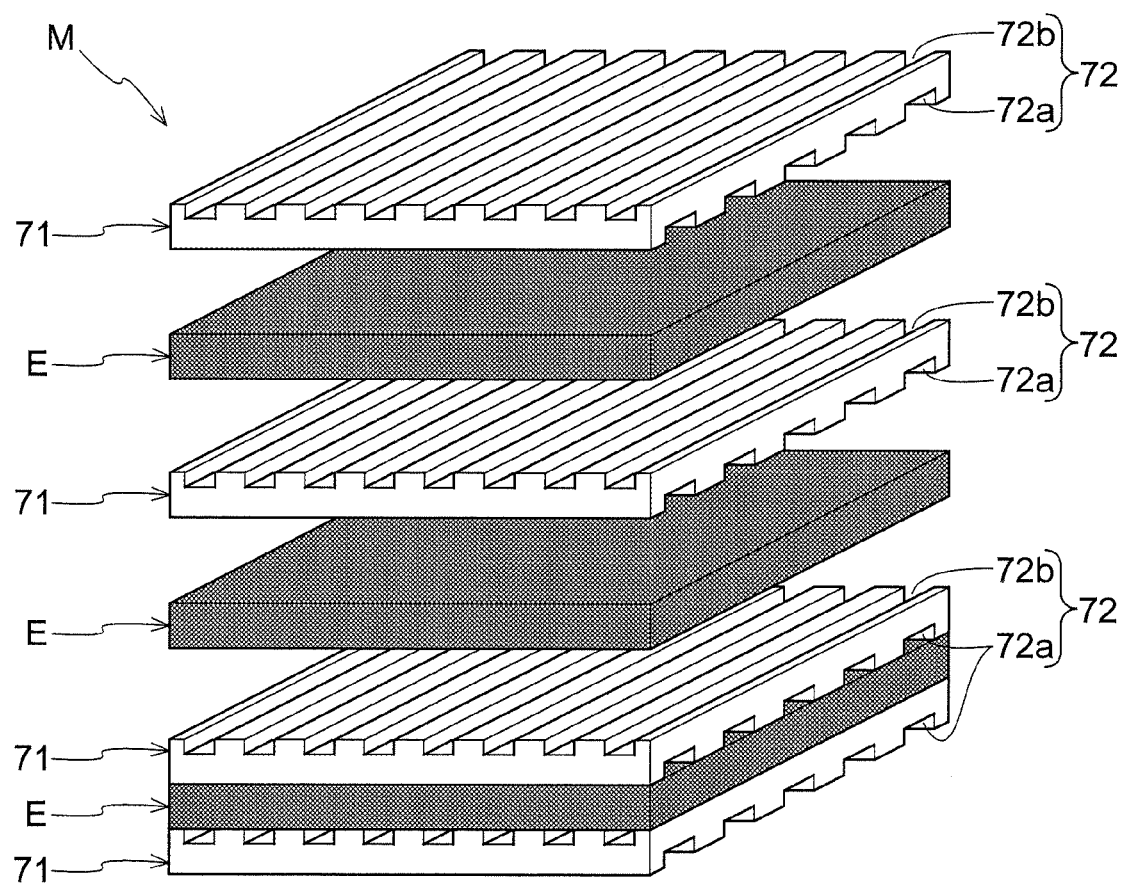
FIG. 4 is a schematic diagram showing a configuration of an electrochemical module.

FIG. 4 shows another embodiment of the electrochemical module M. The electrochemical module M according to a third embodiment is configured by stacking the above-described electrochemical elements E with cell connecting members 71 being sandwiched therebetween.

Each of the cell connecting members 71 is a plate-like member that has electrical conductivity and does not have gas permeability, and the upper face and the lower face are respectively provided with grooves 72 that are orthogonal to each other. The cell connecting members 71 can be formed using a metal such as stainless steel or a metal oxide.

As shown in FIG. 4, when the electrochemical elements E are stacked with the cell connecting members 71 being sandwiched therebetween, a gas can be supplied to the electrochemical elements E through the grooves 72. Specifically, the grooves 72 on one side are first gas passages 72a and supply gas to the front side of one electrochemical element E, that is to say, the counter electrode layer 6. The grooves 72 on the other side are second gas passages 72b and supply gas from the back side of one electrochemical element E, that is, the back face of the metal support 1, through the penetration spaces 1c to the electrode layers 2.

In the case of operating this electrochemical module M as a fuel cell, oxygen is supplied to the first gas passages 72a, and hydrogen is supplied to the second gas passages 72b. Accordingly, a fuel cell reaction progresses in the electrochemical elements E, and electromotive force and electrical current are generated. The generated power is extracted to the outside of the electrochemical module M from the cell connecting members 71 at the two ends of the stack of electrochemical elements E.

It should be noted that although the grooves 72 that are orthogonal to each other are respectively formed on the front face and the back face of each of the cell connecting members 71 in the third embodiment, grooves 72 that are parallel to each other can be respectively formed on the front face and the back face of each of the cell connecting members 71.

Other Embodiments (1) In the above-mentioned embodiments, the least square plane $\alpha$ is calculated through the least squares method using at least four points P that are located on a plurality of straight lines L passing through the center of gravity G of the metal support 1 and are opposed to each other in the plate face of the metal support 1 with the center of gravity G being located at the center therebetween. The warping degree is calculated based on the value Da, which is a difference between the positive-side maximum displacement value and the negative-side maximum displacement value that are obtained based on the least square plane $\alpha$ and are opposed to each other. However, the warping degree can also be calculated using the following methods.

(1-1)

A least square value $\alpha V$ determined through the least squares method using at least three points P that are randomly arranged in the plate face of the metal support 1 may be calculated. That is, instead of using a plurality of points P to calculate a least square plane $\alpha$ that typifies the plurality of points P, a least square value $\alpha V$ indicated by a straight line and the like that typifies the plurality of points P may be calculated. It should be noted that, in this embodiment and the other, the least square value $\alpha V$ encompasses a straight line, a plane (least square plane $\alpha$), and the like that typify the plurality of points P, for example.

Based on the least square value $\alpha V$, which is indicated by a straight line or the like, a first difference D1 between the positive-side maximum displacement value on the positive side and the least square value $\alpha V$ and a second difference D2 between the negative-side maximum displacement value on the negative side and the least square value $\alpha V$ are calculated, for example. Furthermore, as in the above-mentioned embodiments, the warping degree is calculated by dividing Da by the maximum length Lmax so as to be capable of comparing the magnitudes of the warping degrees based on a certain value even among metal supports 1 that are different in size.

With the method above, as in the above-mentioned embodiments, the warping degree of the metal support 1 can be accurately determined.

(1-2)

Also, a least square value $\alpha V$ may be calculated through the least squares method using at least three points P that are located on at least one straight line L passing through the center of gravity G of the metal support 1 and are opposed to each other in the plate face of the metal support 1 with the center of gravity G being located at the center therebetween. A method for calculating a warping degree based on the least square value $\alpha V$ is the same as the above-described method.

With the method above, the least square value $\alpha V$ is calculated using points P located in a direction away from each other with respect to the center of gravity G in the plate face. That is, the least square value $\alpha V$ is calculated based on points P scattered in the plate face rather than points located in a localized region on the metal support 1. Accordingly, the least square value $\alpha V$ is calculated as a value relating to the shape of the plate face of the metal support 1. Using this least square value $\alpha V$ as a reference makes it possible to accurately calculate Da used as a reference for determining the warping degree of the metal support 1.

(1-3)

Also, a difference Da1 between the positive-side maximum displacement value and the negative-side maximum displacement value may be determined using points P located at positions that are located on at least one straight line L passing through the center of gravity G of the metal support 1 and are opposed to each other in the plate face of the metal support 1 with the center of gravity G being located at the center therebetween. In the same manner as described above, the warping degree is calculated by dividing Da1 by the maximum length Lmax.

In this case, the difference Da1 may be calculated using a plurality of points P located on one straight line L or a plurality of points P located on a plurality of straight lines L.

(2) In the above-mentioned embodiments, Da is divided by the maximum length Lmax so as to be capable of comparing the warping degrees based on a certain value even among metal supports 1 that are different in size. However, a value obtained by dividing Da by the area of the plate face of the metal support 1 may also be used as the warping degree. Also, in this case, the magnitudes of the warping degrees can be compared based on a certain value and determined even among metal supports 1 that are different in size.

(3) In the above-mentioned embodiments, a plurality of straight lines L passing through the center of gravity G of the metal support 1 divide 360° by a predetermined angle. However, a plurality of straight lines L passing through the center of gravity G may also be away from each other at random angles.

(4) In the above-mentioned embodiments, the points P on the metal support 1 used to calculate Da are located in the region between the peripheral edge of the metal support 1 and the hole region 1g, namely in the peripheral edge portion OP of the metal support 1. However, the points P on the metal support 1 used to calculate Da need only be any points P on the metal support 1 and are not limited to the points P located in the peripheral edge portion OP.

(5) Although the electrochemical elements E are used in a solid oxide fuel cell in the above-mentioned embodiments, the electrochemical elements E can also be used in a solid oxide electrolytic (electrolysis) cell, an oxygen sensor using a solid oxide, and the like.

(6) In the above-mentioned embodiments, a composite material such as NiO-GDC, Ni-GDC, NiO—YSZ, Ni-YSZ, CuO—CeO$_2$, or Cu—CeO$_2$ is used as the material of the electrode layer 2, and a complex oxide such as LSCF or LSM is used as the material of the counter electrode layer 6. With this configuration, the electrode layer 2 serves as a fuel electrode (anode) when hydrogen gas is supplied thereto, and the counter electrode layer 6 serves as an air electrode (cathode) when air is supplied thereto, thus making it possible to use the electrochemical element E as a cell for a solid oxide fuel cell. It is also possible to change this configuration and thus configure an electrochemical element E such that the electrode layer 2 can be used as an air electrode and the counter electrode layer 6 can be used as a fuel electrode. That is, a complex oxide such as LSCF or LSM is used as the material of the electrode layer 2, and a composite material such as NiO-GDC, Ni-GDC, NiO—YSZ, Ni-YSZ, CuO—CeO$_2$, or Cu—CeO$_2$ is used as the material of the counter electrode layer 6. With this configuration, the electrode layer 2 serves as an air electrode when air is supplied thereto, and the counter electrode layer 6 serves as a fuel electrode when hydrogen gas is supplied thereto, thus making it possible to use the electrochemical element E as a cell for a solid oxide fuel cell.

It should be noted that the configurations disclosed in the above-described embodiments can be used in combination with configurations disclosed in other embodiments as long as they are compatible with each other. The embodiments disclosed in this specification are illustrative, and embodiments of the present invention are not limited thereto and can be modified as appropriate without departing from the object of the present invention.

INDUSTRIAL APPLICABILITY

The present invention can be applied to an electrochemical element and a cell for a solid oxide fuel cell.

DESCRIPTION OF REFERENCE SIGNS

1 Metal support
1a Front face
1b Back face
1c Penetration space
1d Front-side opening
1e Back-side opening
1f Metal oxide layer
1g Hole region
1h Unit region
T Thickness
D Inside diameter, diameter, hole diameter
P Pitch, interval
S Area (front-side opening)
A Aperture ratio
10 First metal plate
10a First front face
10b First back face
10c First penetration space
10d First front-side opening
10e First back-side opening
10g First hole region
10h First unit region
T1 Thickness
D1 Inside diameter, diameter, hole diameter
P1 Pitch, interval
S1 Area (front-side opening)
A1 Aperture ratio
20 Second metal plate
20a Second front face
20b Second back face
20c Second penetration space
20d Second front-side opening
20e Second back-side opening
T2 Thickness
D2 Inside diameter, diameter, hole diameter
P2 Pitch, interval
G Center of gravity
Y Electrochemical device
Z Energy system
α Least square plane
αV Least square value

The invention claimed is:

1. A metal support for an electrochemical element,
the metal support including a plate face and having a plate shape as a whole,
the metal support being provided with a plurality of penetration spaces that pass through the metal support from a front face to a back face, the front face being a face to be provided with an electrode layer,
a region of the front face provided with the penetration spaces being a hole region,
the metal support satisfying a condition that a warping degree is $1.5 \times 10^{-2}$ or less,
wherein the warping degree is determined by calculating a least square value through a least squares method using at least three points in the plate face of the metal support, calculating a first difference between the least square value and a positive-side maximum displacement value on a positive side with respect to the least square value and a second difference between the least square value and a negative-side maximum displacement value on a negative side that is opposite to the positive side with respect to the least square value, and dividing Da that is a sum of the first difference and the second difference by a maximum length Lmax of the plate face of the metal support that passes through a center of gravity to determine Da/Lmax, which is used as the warping degree.

2. The metal support according to claim 1, wherein at least two points of the at least three points on the plate face of the metal support are located on at least one straight line passing through the center of gravity and are opposed to each other in the plate face of the metal support with the center of gravity being located at a center therebetween.

3. The metal support according to claim 2, wherein, when a plurality of straight lines are used as the straight line, the plurality of straight lines divide 360° by a predetermined angle around the center of gravity.

4. The metal support according to claim 2, wherein the at least two points that are opposed to each other in the plate face of the metal support with the center of gravity being located at a center therebetween are located between a peripheral edge of the metal support and the hole region.

5. The metal support according to claim 2, wherein the at least two points that are opposed to each other in the plate face of the metal support with the center of gravity being located at a center therebetween are located between a peripheral edge of the metal support and the electrode layer to be formed on the metal support.

6. The metal support according to claim 1, wherein the least square value is a least square plane calculated through a least squares method using at least four points in the plate face of the metal support.

7. The metal support according to claim 1, wherein each front-side opening that is an opening of the penetration spaces formed in the front face has a circular shape having a diameter of 10 μm or more and 60 μm or less.

8. The metal support according to claim 1, wherein each back-side opening that is an opening of the penetration spaces formed in the back face has an area or a diameter larger than those of front-side openings that are openings of the penetration spaces formed in the front face.

9. The metal support according to claim 7, wherein intervals between front-side openings that are openings of the penetration spaces formed in the front face are 0.05 mm or more and 0.3 mm or less.

10. The metal support according to claim 1, wherein the metal support has a thickness of 0.1 mm or more and 1.0 mm or less.

11. The metal support according to claim 1, wherein the metal support is made of a Fe—Cr based alloy.

12. An electrochemical element in which at least an electrode layer, an electrolyte layer, and a counter electrode layer are provided on/over the front face of a metal support according claim 1.

13. An electrochemical module in which a plurality of electrochemical elements according to claim 12 are arranged in an assembled state.

14. An electrochemical device comprising at least an electrochemical module according to claim 13, a reformer, and a fuel supply unit that supplies fuel gas containing a reducing component to the electrochemical module.

15. An electrochemical device comprising at least an electrochemical module according to claim 13 and an inverter that extracts power from the electrochemical module.

16. An energy system comprising:
an electrochemical device according to claim 14; and
a waste heat utilization system that reuses heat discharged from the electrochemical device.

17. A solid oxide fuel cell comprising an electrochemical element according to claim 12, wherein a power generation reaction is caused in the electrochemical element.

18. A method for manufacturing the metal support according to claim 1, comprising
forming the plurality of penetration spaces passing through the metal support from the front face to the back face through laser processing, punching processing, etching processing, or a combination thereof.

19. The method for manufacturing the metal support according to claim 18, comprising a smoothing processing step.

20. An energy system comprising:
an electrochemical device according to claim 15; and
a waste heat utilization system that reuses heat discharged from the electrochemical device.

* * * * *